US005647896A

United States Patent [19]

Nishimura et al.

[11] Patent Number: 5,647,896

[45] Date of Patent: Jul. 15, 1997

[54] COLOR-DEVELOPING AGENTS AND COLOR-DEVELOPING SHEETS

[75] Inventors: Takeshi Nishimura; Tomoko Kamashita; Masaru Wada; Teruyuki Nagata, all of Ohmuta; Yoshimitsu Tanabe, Yokohama; Kiyoharu Hasegawa, Yokohama; Masakatsu Nakatsuka, Yokohama, all of Japan

[73] Assignee: Mitsui Toatsu Chemicals, Inc., Tokyo, Japan

[21] Appl. No.: 544,986

[22] Filed: Oct. 30, 1995

[30] Foreign Application Priority Data

| | | | |
|---|---|---|---|
| Nov. 8, 1994 | [JP] | Japan | 6-273963 |
| Nov. 15, 1994 | [JP] | Japan | 6-280404 |
| Nov. 18, 1994 | [JP] | Japan | 6-284738 |
| Nov. 25, 1994 | [JP] | Japan | 6-290823 |
| Dec. 13, 1994 | [JP] | Japan | 6-309153 |
| Feb. 17, 1995 | [JP] | Japan | 7-029389 |
| Mar. 23, 1995 | [JP] | Japan | 7-064407 |
| Mar. 27, 1995 | [JP] | Japan | 7-067307 |

[51] Int. Cl.$^6$ .................... C09D 11/02

[52] U.S. Cl. .................... 106/31.18; 523/161

[58] Field of Search .................... 106/21 R, 21 A; 503/216

[56] References Cited

U.S. PATENT DOCUMENTS

| | | | |
|---|---|---|---|
| 3,983,292 | 9/1976 | Saito et al. | 428/306 |
| 4,121,013 | 10/1978 | Miller et al. | 106/21 A |
| 4,754,063 | 6/1988 | Nachbur | 562/468 |
| 4,929,710 | 5/1990 | Scholl et al. | 528/205 |
| 4,952,648 | 8/1990 | Yamaguchi et al. | 525/539 |
| 5,382,560 | 1/1995 | Hisada et al. | 106/21 R |
| 5,393,332 | 2/1995 | Saito et al. | 106/21 R |

FOREIGN PATENT DOCUMENTS 6-286304 10/1994 Japan .

*Primary Examiner*—Helene Klemanski
*Attorney, Agent, or Firm*—Burns, Doane, Swecker & Mathis

[57] ABSTRACT

Provided are a color-developing agent comprising a multivalent metal salt of a salicylic acid derivative and a sulfonated phenol and/or a metal salt thereof and having excellent initial and ultimate color-developing capacities and improved waterproofness; and a color-developing sheet making use of the color-developing agent.

19 Claims, No Drawings

COLOR-DEVELOPING AGENTS AND COLOR-DEVELOPING SHEETS

BACKGROUND OF THE INVENTION

1. Field of the Invention

This invention relates to color-developing agents for recording materials (for example, pressure-sensitive copying paper). In particular, the present invention provides color-developing agents excellent in initial and ultimate color-developing capacities and also in waterproofness. Further, this invention also pertains to color-developing sheets making use of these color-developing agents.

2. Description of the Related Art

Salicylic acid derivatives, for example, metal salts of 3,5-di-substituted salicylic acid derivatives are conventionally known to be useful as color-developing agents for pressure-sensitive copying paper. Each 3,5-di-substituted salicylic acid derivative is produced from its corresponding 2,4-di-substituted phenol derivative and carbon dioxide, namely, by using the Kolbe-Schmitt reaction (see, for example, U.S. Pat. No. 3,983,292). However, use of a metal salt of a 3,5-di-substituted salicylic acid derivative obtained in this manner, for example, zinc 3,5-di($\alpha$-methylbenzyl) salicylate, as a color-developing agent for pressure-sensitive copying paper creates a problem such that developed color images fade away when exposed to water.

As measures for overcoming this problem in physical property, the following production processes have already been proposed. Namely, a salicylate ester and styrene are reacted. Subsequent to hydrolysis of the resulting salicylate ester resin, a multivalent metal compound is caused to act to produce the multivalent metal salt of the salicylic acid resin. For example, styrene is reacted with methyl salicylate in the presence of concentrated sulfuric acid to obtain a methyl salicylate resin, followed by hydrolysis in an aqueous alkaline solution. A multivalent metal compound (e.g., zinc sulfate) is then caused to act, whereby the multivalent metal salt of the salicylic acid resin is produced (U.S. Pat. No. 4,952,648). As an alternative, a salicylic acid and a styrene are reacted at 50° to 150° C. in the presence of an acid catalyst, followed by the reaction with a metal salt of a fatty acid so that the metal salt of a high molecular salicylic acid resin is produced (U.S. Pat. No. 4,929,710). Color-developing agents obtained by these processes, however, are still unable to bring about an improvement in both initial and ultimate color-developing capacities.

A color-developing agent has been proposed recently, which features inclusion of (A) a multivalent metal salt of a salicylic acid derivative and (B) a phenol substituted by styrene or the like or a metal salt thereof as essential components (Japanese Patent Laid-Open No. 286304/1994). However this color-developing agent is also still insufficient in color-developing capacity.

SUMMARY OF THE INVENTION

An object of the present invention is to provide a color-developing agent and a color-developing sheet, which have excellent initial and ultimate color-developing capacities and also have improved waterproofness.

With a view to overcoming the above-mentioned problem, the present inventors have proceeded with an extensive investigation. As a result, it has been found that a color-developing agent, which is composed of a multivalent metal salt of a salicylic acid derivative and a sulfonated phenol or a metal salt thereof as essential components, is good in waterproofness and is excellent in both initial and ultimate color-developing capacities, leading to the present invention. The present invention therefore provides:

(1) A color-developing agent comprising a multivalent metal salt of a salicylic acid derivative and a sulfonated phenol or the like (which will hereinafter be collectively referred to as a "sulfonated phenol") and/or a metal salt thereof.

(2) A color-developing agent as described above under (1), wherein the content of the sulfonated phenol and/or the metal salt thereof is 0.5 to 40 mole % based on the multivalent metal salt of the salicylic acid derivative.

(3) A color-developing agent as described above under (1), wherein the salicylic acid derivative is a salicylic acid substituted by styrene or the like (which will hereinafter be collectively referred to as a "styrene-substituted salicylic acid") or a derivative thereof.

(4) A color-developing agent as described above under (1), wherein the sulfonated phenol is a styrene-substituted sulfonated phenol.

(5) A color-developing agent comprising a multivalent metal salt of a styrene-substituted salicylic acid derivative and a styrene-substituted sulfonated phenol and/or a metal salt thereof, said multivalent metal salt having been obtained by reacting styrene or the like (which will hereinafter be collectively referred to as a "styrene") with a salicylic acid or the like and a phenol or the like (which will hereinafter be collectively referred to as a "salicylic acid" and a "phenol", respectively) in the presence of sulfuric acid as a catalyst and sulfonating agent to obtain a resin and then reacting a multivalent metal compound with the resin.

(6) A process for the production of a color-developing agent comprising a multivalent metal salt of a styrene-substituted salicylic acid derivative and a styrene-substituted sulfonated phenol and/or a metal salt thereof, which comprises reacting a styrene with a salicylic acid and a phenol in the presence of sulfuric acid as a catalyst and sulfonating agent to obtain a resin and then reacting a multivalent metal compound with the resin.

(7) A process as described above under (6), wherein the phenol is used in an amount of 0.5 to 40 mole % based on the salicylic acid.

(8) A process as described above under (6), wherein the styrene is used in an amount 1 to 10 molar times as much as the phenol and salicylic acid.

(9) A color-developing agent comprising a multivalent metal salt of a styrene-substituted salicylic acid derivative and a styrene-substituted sulfonated phenol and/or a metal salt thereof, said multivalent metal salt having been obtained by conducting a first-stage reaction of reacting a phenol and a styrene in the presence of sulfuric acid as a catalyst and sulfonating agent and then a second-stage reaction of adding, to the resulting reaction mixture, a salicylic acid and then the styrene to obtain a resin, followed by the reaction of the resin with a multivalent metal salt.

(10) A process for the production of a color-developing agent comprising a multivalent metal salt of a styrene-substituted salicylic acid derivative and a styrene-substituted sulfonated phenol and/or a metal salt thereof, which comprises conducting a first-stage reaction of reacting a phenol and a styrene in the presence of sulfuric acid as a catalyst and sulfonating agent and then a second-stage reaction of adding, to the resulting reaction mixture, a salicylic acid and then the styrene to obtain a resin, followed by the reaction of the resin with a multivalent metal salt.

(11) A process as described above under (10), wherein the phenol is used in an amount of 0.5 to 40 mole % based on the salicylic acid.

(12) A process as described above under (10), wherein the styrene used in the first-stage reaction is in an amount 1 to 10 molar times as much as the phenol.

(13) A process as described above under (10), wherein the total amount of the styrene used in the first-stage and second-stage reactions is 1 to 15 times as much as that of the phenol and salicylic acid.

(14) A color-developing sheet with a layer formed thereon and comprising a color-developing agent as described above under any one of (1) to (5) and (9).

DETAILED DESCRIPTION OF THE PREFERRED EMBODIMENTS

The term "salicylic acid derivative" as used herein embraces nuclear-substitution salicylic acids in each of which one to four hydrogen atoms at 3 to 6 positions of salicylic acid have each been substituted by a $C_4$ or higher alkyl, cycloalkyl, alkoxy, aryl, aryloxy, alkylaryl or aralkyl group or a halogen atom; salicylic acid resins each containing two or more salicylic acid units as partial skeletons in its principal chain or side chain; and mixtures of two or more of these nuclear-substitution salicylic acids and salicylic acid resins. Specific examples include, but should not be limited to in the present invention, such as:

3-α-methylbenzylsalicylic acid, 5-α-methylbenzylsalicylic acid, 5-benzylsalicylic acid, 5-cyclohexylsalicylic acid, 5-tert-octylsalicylic acid, 5-phenylsalicylic acid, 3-methyl-5-isononylsalicylic acid, 3-methyl-5-isododecylsalicylic acid, 3-methyl-5-isopentaldecylsalicylic acid, 3,5-di(α-methylbenzyl) salicylic acid, 3,5-di(tert-butyl)salicylic acid, 3,5-di(α,α-dimethylbenzyl)salicylic acid, 3,5-di(cyclohexyl)salicylic acid, 3-methyl-5-(α-methylbenzyl)salicylic acid, 3-methyl-5-(α,α-dimethylbenzyl)salicylic acid, 3,5-di-tert-butyl-6-methylsalicylic acid, 3-tert-butyl-5-phenylsalicylic acid, 3,5-di-tert-amylsalicylic acid, 3-tert-octyl-6-methylsalicylic acid, 3-cyclohexyl-5-isononylsalicylic acid, 3-phenyl-5-isononylsalicylic acid, 3-(α-methylbenzyl)-5-isononylsalicylic acid, 3-isopropyl-5-isononylsalicylic acid, 3-isononylsalicylic acid, 3-isononyl-5-methylsalicylic acid, 3-isononyl-5-cyclohexylsalicylic acid, 3-isononyl-5-tert-butylsalicylic acid, 3-isononyl-5-phenylsalicylic acid, 3-isononyl-5-(α-methylbenzyl)salicylic acid, 3-isononyl-5-(4,α-dimethylbenzyl)salicylic acid, 3-isononyl-5-(α,α-dimethylbenzyl)salicylic acid, 3-(α,α-dimethylbenzyl)-5-isononylsalicylic acid, 3-isononyl-6-methylsalicylic acid, 5-isononylsalicylic acid, 3-tert-butyl- 5-isononylsalicylic acid, 3,5-diisononylsalicylic acid, 3-indodecylsalicylic acid, 3-indodecyl-5-methylsalicylic acid, 3-isododecyl-6-methylsalicylic acid, 3-isopropyl-5-indodecylsalicylic acid, 3-indodecyl-5-ethylsalicylic acid, 5-indodecylsalicylic acid, 3-isopentadecylsalicylic acid, 3-isopentadecyl-5-methylsalicylic acid, 3-isopentadecyl-6-methylsalicylic acid, 5-isopentadecylsalicylic acid, 3-cyclohexyl-5-(α-methylbenzyl)salicylic acid, 3-phenyl-5-(α-methylbenzyl) salicylic acid, 3-phenyl-5-(α,α-dimethylbenzyl)salicylic acid, 3-(α-methylbenzyl)-5-methylsalicylic acid, 3-(α-methylbenzyl)-6-methylsalicylic acid, 3-(α-methylbenzyl)-5-phenylsalicylic acid, 3-(α-methylbenzyl)-5-(α,α-dimethylbenzyl)salicylic acid, 3-(α-methylbenzyl)-5-bromosalicylic acid, 3-(α,4-dimethylbenzyl)-5-methylsalicylic acid, 3,5-di(α,4-dimethylbenzyl)salicylic acid, 3-α-methylbenzyl-5-(α,α-dimethylbenzyl)salicylic acid, 3-α-methylbenzyl-5-bromosalicylic acid, 3-(α,α-dimethylbenzyl)-5-methylsalicylic acid, 3-(α,α-dimethylbenzyl)-6-methylsalicylic acid, 5-(4-mesitylmethylbenzyl)salicylic acid, 3-α-methylbenzyl-5-(1,3-diphenylbutyl)salicylic acid, 3-(1,3-diphenylbutyl)-5-α-methylbenzylsalicylic acid, 3-[α-methyl-4'-(α-methylbenzyl)-benzyl]salicylic acid, 3-α-methylbenzyl-5-[α-methyl-4'-(α-methylbenzyl)benzyl]salicylic acid, 3-[α-methyl-4'-(α-methylbenzyl)benzyl-5-α-methylbenzylsalicylic acid, benzylated styrenated salicylic acids and pinenated salicylic acids.

As the salicylic acid derivative, preferred is a styrene-substituted salicylic acid derivative obtained by reacting 1 to 10 moles of the corresponding styrene with 1 mole of the corresponding salicylic acid derivative.

Illustrative of the styrene include, but are not limited to, styrene, 2-methylstyrene, 3-methylstyrene, 4-methylstyrene, 2-ethylstyrene, 4-ethylstyrene, 3-isopropylstyrene, 4-isopropylstyrene, 4-n-butylstyrene, 4-tert-butylstyrene, 4-cyclohexylstyrene, 4-n-octylstyrene, 4-n-decylstyrene, 2,4-dimethylstyrene, 2,5-dimethylstyrene, 3-methoxystyrene, 4-methoxystyrene, 4-ethoxystyrene, α-methylstyrene, α-ethylstyrene, α-n-butylstyrene, α-isobutylstyrene, α,β-dimethylstyrene, αβ-diethylstyrene, α-methyl-β-isopropylstyrene, α-n-propyl-β-methylstyrene, 4-(α,α-dimethylbenzyl)styrene, 4-phenylstyrene, 4-fluorostyrene, 2-chlorostyrene, 3-chlorostyrene, 4-chlorostyrene and 4-bromostyrene. These styrenes can be used either singly or in combination. Preferred are styrene and alkyl-substituted styrenes such as 4-methylstyrene.

Examples of the multivalent metal, which constitutes the multivalent metal salt of the salicylic acid derivative useful in the present invention, include divalent, trivalent and tetravalent metals such as zinc, calcium, magnesium, barium, lead, aluminum, zirconium, vanadium and tin. Among these, preferred are zinc, aluminum and tin, with zinc being particularly preferred.

The multivalent metal salt of the salicyclic acid derivative can be produced in a manner known per se in the art. Examples include a process in which an alkali metal salt of a salicylic acid derivative and a multivalent metal salt are reacted in water or in a solvent in which the alkali metal salt and the multivalent metal salt are both soluble; and a process in which a salicylic acid derivative is mixed with a multivalent metal compound, followed by thermal modification.

Examples of the sulfonated phenol usable in the present invention include sulfonated phenols such as 4-hydroxy-benzenesulfonic acid, 2-hydroxy-benzenesulfonic acid and 4-hydroxy-benzene1,3-disulfonic acid; and styrene-substituted sulfonated phenols such as 3-(α-methylbenzyl) -4-hydroxy-benzenesulfonic acid, 3-(α-methylbenzyl)-4-hydroxy-benzene-1,5-disulfonic acid, 5-(α-methylbenzyl)-2-hydroxy-benzenesulfonic acid, 3-(α-methylbenzyl)-2-hydroxy-benzenesulfonic acid, 5-[α-methyl-4'-(α-methylbenzyl)benzyl]-2-hydroxy-benzenesulfonic acid, 5-[α-methyl-4'-(α-methylbenzyl)benzyl]-2-hydroxy-benzene1,3-sulfonic acid, 3,5-di(α-methylbenzyl)-4-hydroxy-benzenesulfonic acid, 3,5-di(α-methylbenzyl)-2-hydroxy-benzenesulfonic acid, 3,5-di(α,α-dimethylbenzyl) -4-hydroxy-benzenesulfonic acid, 3,5-di(α,α-dimethylbenzyl)-2-hydroxy-benzenesulfonic acid, 3-α-methylbenzyl-5-(1,3-diphenylbutyl)-2-hydroxy-benzenesulfonic acid, 3-(1,3-diphenylbutyl)-5-(α-methylbenzyl)-2-hydroxy-benzenesulfonic acid, 3-(α-methylbenzyl)-5-[α-methyl-4'-(α-methylbenzyl)benzyl]-2-hydroxy-benzenesulfonic acid, 3-[α-methyl-4'-(α-methylbenzyl)benzyl]-5-(α-methylbenzyl)-2-hydroxy-benzenesulfonic acid and 3,5-di[α-methyl-4'-(α-methylbenzyl)benzyl]-2-hydroxy-benzenesulfonic acid. Likewise included are sulfonated 2-phenylphenols such as 2-phenylphenol-4-sulfonic acid, 2-phenylphenol-6-sulfonic acid and 2-phenylphenol-4,6-disulfonic acid; styrene-substituted sulfonated 2-phenylphenols such as 6-(α-methylbenzyl)-2-phenylphenol-4-sulfonic acid, 6-(α,α-dimethylbenzyl)-2-phenylphenol-4-sulfonic acid, 6-[α-methyl-4'-(α-methylbenzyl)benzyl]-2-phenylphenol-4-sulfonic acid, 6-(1,3-diphenylbutyl)-2-phenylphenol-4-sulfonic acid, 4-(α-methylbenzyl)-2-phenylphenol-6-sulfonic acid, 4-(α,α-dimethylbenzyl)-2-phenylphenol-6-sulfonic acid, 4-[α-methyl-4'-(α-methylbenzyl)benzyl]-2-phenylphenol-6-sulfonic acid and 4-(1,3-diphenylbutyl)-2-phenylphenol-6-sulfonic acid; sulfonated 3-phenylphenols such as 3-phenylphenol-2-sulfonic acid, 3-phenylphenol-4-sulfonic acid, 3-phenylphenol-6-sulfonic acid, 3-phenylphenol-2,4-disulfonic acid, 3-phenylphenol-2,6-disulfonic acid and 3-phenylphenol-4,6-disulfonic acid; styrene-substituted sulfonated 3-phenylphenols such as 6-(α-methylbenzyl)-3-phenylphenol-4-sulfonic acid, 6-(α,α-dimethylbenzyl)-3-phenylphenol-4-sulfonic acid, 6-[α-methyl-4'-(α-methylbenzyl)benzyl]-3-phenylphenol-4-sulfonic acid, 6-(1,3-diphenylbutyl)-3-phenylphenol-4-sulfonic acid, 2-α-methylbenzyl-3-phenylphenol-4-sulfonic acid, 2-(α,α-dimethylbenzyl)-3-phenylphenol-4-sulfonic acid, 2-[α-methyl-4'-(α-methylbenzyl)benzyl]-3-phenylphenol-4-sulfonic acid, 2-(1,3-diphenylbutyl)-3-phenylphenol-4-sulfonic acid, 2,6-di(α-methylbenzyl)-3-phenylphenol-4-sulfonic acid, 2,6-di(α,α-dimethylbenzyl)-3-phenylphenol-4-sulfonic acid, 2,6-di[α-methyl-4'-(α-methylbenzyl)benzyl]-3-phenylphenol-4-sulfonic acid, 2,6-di(1,3-diphenylbutyl)-3-phenylphenol-4-sulfonic acid, 4-α-methylbenzyl-3-phenylphenol-6-sulfonic acid, 4-(α,α-dimethylbenzyl)-3-phenylphenol-6-sulfonic acid, 4-[α-methyl-4'-(α-methylbenzyl)benzyl]-3-phenylphenol-6-sulfonic acid, 4-(1,3-diphenylbutyl)-3-phenylphenol-6-sulfonic acid, 2-α-methylbenzyl-3-phenylphenol-6-sulfonic acid, 2-(α,α-dimethylbenzyl)-3-phenylphenol-6-sulfonic acid, 2-[α-methyl-4'-(α-methylbenzyl)benzyl]-3-phenylphenol-6-sulfonic acid, 2-(1,3-diphenylbutyl)-3-phenylphenol-6-sulfonic acid, 2,4-di(α-methylbenzyl)-3-phenylphenol-6-sulfonic acid, 2,4-di(α,α-dimethylbenzyl)-3-phenylphenol-6-sulfonic acid, 2,4-di[α-methyl-4'-(α-methylbenzyl)benzyl]-3-phenylphenol-6-sulfonic acid, 2,4-(1,3-diphenylbutyl)-3-phenylphenol-6-sulfonic acid, 6-(α-methylbenzyl)-3-phenylphenol-2-sulfonic acid, 6-(α,α-dimethylbenzyl)-3-phenylphenol-2-sulfonic acid, 6-[α-methyl-4'-(α-methylbenzyl)benzyl]-3-phenylphenol-2-sulfonic acid, 6-(1,3-diphenylbutyl)-3-phenylphenol-2-sulfonic acid, 4-(α-methylbenzyl)-3-phenylphenol-2-sulfonic acid, 4-(α,α-dimethylbenzyl)-3-phenylphenol-2-sulfonic acid, 4-[α-methyl-4'-(α-methylbenzyl)benzyl]-3-phenylphenol-2-sulfonic acid, 4-(1,3-diphenylbutyl)-3-phenylphenol-2-sulfonic acid, 4,6-di(α-methylbenzyl)-3-phenylphenol-2-sulfonic acid, 4,6-di(α,α-dimethylbenzyl)-3-phenylphenol-2-sulfonic acid, 4,6-di[α-methyl-4'-(α-methylbenzyl)benzyl]-3-phenylphenol-2-sulfonic acid, 4,6-di(1,3-diphenylbutyl)-3-phenylphenol-2-sulfonic acid, 6-(α-methylbenzyl)-3-phenylphenol- 2,4-disulfonic acid, and 4-(α,α-dimethylbenzyl)-3-phenylphenol-2,6-disulfonic acid; sulfonated 4-phenylphenols such as 4-phenylphenol-2-sulfonic acid, and 4-phenylphenol-2,6-disulfonic acid; styrene-substituted sulfonated 4-phenylphenols such as 2-(α-methylbenzyl)-4-phenylphenol-6-sulfonic acid, 2-(α,α-dimethylbenzyl)-4-phenylphenol-6-sulfonic acid, 2-[α-methyl-4'-(α-methylbenzyl)benzyl]-4-phenylphenol-6-sulfonic acid, and 2-(1,3-diphenylbutyl)-4-phenylphenol-6-sulfonic acid; sulfonated 3-methylphenols such as 3-methylphenol-2-sulfonic acid, 3-methylphenol-4-sulfonic acid, 3-methylphenol-6-sulfonic acid, 3-methylphenol-2,4-disulfonic acid, 3-methylphenol-2,6-disulfonic acid, 3-methylphenol-4,6-disulfonic acid, and 3-methylphenol-2,4,6-trisulfonic acid; styrene-substituted sulfonated 3-methylphenols such as 6-(α-methylbenzyl)-3-methylphenol-4-sulfonic acid, 6-(α,α-dimethylbenzyl)-3-methylphenol-4-sulfonic acid, 6-[α-methyl-4'-(α-methylbenzyl)benzyl]-3-methylphenol-4-sulfonic acid, 6-(1,3-diphenolbutyl)-3-methylphenol-4-sulfonic acid, 2-(α-methylbenzyl)-3-methylphenol-4-sulfonic acid, 2-(α,α-dimethylbenzyl)-3-methylphenol-4-sulfonic acid, 2-[α-methyl-4'-(α-methylbenzyl)benzyl]-3-methylphenol-4-sulfonic acid, 2-(1,3-diphenylbutyl)-3-methylphenol-4-sulfonic acid, 2,6-di(α-methylbenzyl)- 3-methylphenol-4-sulfonic acid; 2,6-di(α,α-dimethylbenzyl)-3-methylphenol-4-sulfonic acid, 2,6-di[α-methyl-4'-(α-methylbenzyl) benzyl]-3-methylphenol-4-sulfonic acid, 2,6-di(1,3-diphenylbutyl)-3-methylphenol-4-sulfonic acid, 4-(α-methylbenzyl)-3-methylphenol-6-sulfonic acid, 4-(α,α-dimethylbenzyl)-3-methylphenol-6-sulfonic acid, 4-[α-methyl-4'-(α-methylbenzyl)benzyl]-3-methylphenol-6-sulfonic acid, 4-(1,3-diphenylbutyl)-3-methylphenol-6-sulfonic acid, 2-(α-methylbenzyl)-3-methylphenol-6-sulfonic acid, 2-(α,α-dimethylbenzyl)-3-methylphenol-6-sulfonic acid, 2-[α-methyl-4'-(α-methylbenzyl)benzyl]-3-methylphenol-6-sulfonic acid, 2-(1,3-diphenylbutyl)-3-methylphenol-6-sulfonic acid, 2,4-di(α-methylbenzyl)-3-methylphenol-6-sulfonic acid, 2,4-di(α,α-dimethylbenzyl)-3-methylphenol-6-sulfonic acid, 2,4-di[α-methyl-4'-(α-methylbenzyl)benzyl]-3-methylphenol-6-sulfonic acid, 2,4-di(1,3-diphenylbutyl)-3-methylphenol-6-sulfonic acid, 6-(α-methylbenzyl)-3-methylphenol-2-sulfonic acid, 6-(α,α-dimethylbenzyl)-3-methylphenol-2-sulfonic acid, 6-[α-methyl-4'-(α-methylbenzyl)benzyl]-3-methylphenol-2-sulfonic acid, 6-(1,3-diphenylbutyl)-3-methylphenol-2-sulfonic acid, 4-(α-methylbenzyl)-3-methylphenol-2-sulfonic acid, 4-(α,α-dimethylbenzyl)-3-methylphenol-2-sulfonic acid, 4-[α-methyl-4'-(α-methylbenzyl)benzyl]-3-methylphenol-2-sulfonic acid, 4-(1,3-diphenylbutyl)-3-methylphenol-2-sulfonic acid, 4,6-(α-methylbenzyl)-3-methylphenol-2-sulfonic acid, 4,6-di(α,α-dimethylbenzyl)-3-methylphenol-2-sulfonic acid, 4,6-di[α-methyl-4'-(α-methylbenzyl)benzyl]-3-methylphenol-2-sulfonic acid, 4,6-di(1,3-diphenylbutyl)-3-methylphenol-2-sulfonic acid, 6-(1,3-diphenylbutyl)-3-methylphenol-2,4-disulfonic acid and 4-[α-methyl-4'-(α-methylbenzyl)benzyl]-3-methylphenol-2,6-disulfonic acid; sulfonated 2-ethylphenols such as 2-ethylphenol-4-sulfonic acid, 2-ethylphenol-6-sulfonic acid and 2-ethylphenyl-4,6-disulfonic acid; styrene-substituted sulfonated 2-ethylphenols such as 6-(α-methylbenzyl)-2-ethylphenol-4-sulfonic acid, 6-(α,α-dimethylbenzyl)-2-ethylphenol-4-sulfonic acid, 6-[α-methyl-4'-(α-methylbenzyl)benzyl]-2-ethylphenol-4-sulfonic acid, 6-(1,3-diphenylbutyl)-2-ethylphenol-4-sulfonic acid, 4-(α-methylbenzyl)-2-ethylphenol-6-sulfonic acid, 4-(α,α-dimethylbenzyl)-2-ethylphenol-6-sulfonic acid, 4-[α-methyl-4'-(α-methylbenzyl)benzyl]-2-ethylphenol-6-sulfonic acid and 4-(1,3-diphenylbutyl)-2-ethylphenol-6-sulfonic acid; sulfonated 4-isopropylphenols such as 4-isopropylphenol-2-sulfonic acid and 4-isopropylphenol-2,6-disulfonic acid; styrene-substituted sulfonated 4-isopropylphenols such as 2-(α-methylbenzyl)-4-isopropylphenol-6-sulfonic acid, 2-(α,α-dimethylbenzyl)

-4-isopropylphenol-6-sulfonic acid, 2-[α-methyl-4'-(α-methylbenzyl)benzyl]-4-isopropylphenol-6-sulfonic acid and 2-(1,3-diphenylbutyl)-4-isopropylphenol-6-sulfonic acid; sulfonated 4-tert-butylphenols such as 4-tert-butylphenol-2-sulfonic acid and 4-tert-butylphenol-2,6-disulfonic acid; styrene-substituted sulfonated 4-tert-butylphenols such as 2-(α-methylbenzyl)-4-tert-butylphenol-6-sulfonic acid, 2-(α,α-dimethylbenzyl)-4-tert-butylphenol-6-sulfonic acid, 2-[α-methyl-4'-(α-methylbenzyl)benzyl]-4-tert-butylphenol-6-sulfonic and 2-(1.,3-diphenylbutyl)-4-tert-butylphenol-6-sulfonic acid; sulfonated 4-cyclohexylphenols such as 4-cyclohexylphenol-2-sulfonic acid, 4-cyclohexylphenol-2,6-disulfonic acid; styrene-substituted sulfonated 4-cyclohexylphenols such as 2-(α-methylbenzyl)-4-cyclohexylphenol-6-sulfonic acid, 2-(α,α-dimethylbenzyl)-4-cyclohexylphenol-6-sulfonic acid, 2-[α-methyl-4'-(α-methylbenzyl)benzyl]-4-cyclohexylphenol-6-sulfonic acid and 2-(1,3-diphenylbutyl)-4-cyclohexylphenol-6-sulfonic acid; sulfonated 4-tert-octylphenols such as 4-tert-octylphenol-2-sulfonic acid and 4-tert-octylphenol-2,6-disulfonic acid; styrene-substituted sulfonated 4-tert-octylphenols such as 2-(α-methylbenzyl)-4-tert-octylphenol-6-sulfonic acid, 2-(α,α-dimethylbenzyl)-4-tert-octylphenol-6-sulfonic acid, 2-[α-methyl-4'-(α-methylbenzyl)benzyl]-4-tert-octylphenol-6-sulfonic acid and 2-(1,3-diphenylbutyl)-4-tert-octylphenol-6-sulfonic acid; sulfonated 4-nonylphenols such as 4-nonylphenol-2-sulfonic acid and 4-nonylphenol-2,6-disulfonic acid; styrene-substituted sulfonated 4-nonylphenols such as 2-(α-methylbenzyl)-4-nonylphenol-6-sulfonic acid, 2-(α,α-dimethylbenzyl)-4-nonylphenol-6-sulfonic acid, 2-[α-methyl-4'-(α-methylbenzyl)benzyl]-4-nonylphenol-6-sulfonic acid and 2-(1,3-diphenylbutyl)-4-nonylphenol-6-sulfonic acid; sulfonated 4-decylphenols such as 4-decylphenol-2-sulfonic acid and 4-decylphenol-2,6-disulfonic acid; styrene-substituted sulfonated 4-decylphenols such as 2-(α-methylbenzyl)-4-decylphenol-6-sulfonic acid, 2-(α,α-dimethylbenzyl)-4-decylphenol-6-sulfonic acid, 2-[α-methyl-4'-(α-methylbenzyl)benzyl]-4-decylphenol-6-sulfonic acid and 2-(1,3-diphenylbutyl)-4-decylphenol-6-sulfonic acid; sulfonated cumylphenols such as 2,4-xylenol-6-sulfonic acid, 2,4-di-tert-butylphenol-6-sulfonic acid, 2-methyl-4-nonylphenol-6-sulfonic acid, cumylphenol-2-sulfonic acid and cumylphenol-2,6-disulfonic acid; styrene-substituted sulfonated cumylphenols such as 2-(α-methylbenzyl)-cumylphenol-6-sulfonic acid, 2-(α,α-dimethylbenzyl)-cumylphenol-6-sulfonic acid, 2-[α-methyl-4'-(α-methylbenzyl)benzyl]-cumylphenol-6-sulfonic acid and 2-(1,3-diphenylbutyl)cumylphenol-6-sulfonic acid; sulfonated 4-benzylphenols such as 4-benzylphenol-2-sulfonic acid and 4-benzylphenol-2,6-disulfonic acid; styrene-substituted sulfonated 4-benzylphenols such as 2-(α-methylbenzyl)-4-benzylphenol-6-sulfonic acid, 2-(α,α-dimethylbenzyl)-4-benzylphenol-6-sulfonic acid, 2-[α-methyl-4'-(α-methylbenzyl)benzyl]-4-benzylphenol-6-sulfonic acid and 2-(1,3-diphenylbutyl)-4-benzylphenol-6-sulfonic acid; sulfonated phenylethylphenols such as phenylethylphenol-2-sulfonic acid and phenylethylphenol-2,6-disulfonic acid; styrene-substituted sulfonated phenylethylphenols such as 2-(α-methylbenzyl)-phenylethylphenol-6-sulfonic acid, 2-(α,α-dimethylbenzyl)phenylethylphenol-6-sulfonic acid, 2-[α-methyl-4'-(α-methylbenzyl)benzyl]-phenylethylphenol-6-sulfonic acid and 2-(1,3-diphenylbutyl)-phenylethylphenol-6-sulfonic acid; sulfonated bisphenol As such as 2,4-dimethylbenzylphenol-6-sulfonic acid, bisphenol A-2-sulfonic acid, bisphenol A-6-sulfonic acid, bisphenol A-2,6-disulfonic acid, bisphenol A-2,2'-disulfonic acid, bisphenol A-2,6'-disulfonic acid, bisphenol A-2,2',6-trisulfonic acid and bisphenol A-2,2',6,6'-tetrasulfonic acid; styrene-substituted sulfonated bisphenol A's such as 6-(α-methylbenzyl)-bisphenol A-2-sulfonic acid, 6-(α,α-dimethylbenzyl)-bisphenol A-2-sulfonic acid, 6-[α-methyl-4'-(α-methylbenzyl)benzyl]-bisphenol A-2-sulfonic acid, 6-(1,3-diphenylbutyl)-bisphenol A-2-sulfonic acid, 2'-(α-methylbenzyl)-bisphenol A-2-sulfonic acid, 2'-(α,α-dimethylbenzyl)-bisphenol A-2-sulfonic acid, 2'-[α-methyl-4'-(α-methylbenzyl)benzylbisphenol A-2-sulfonic acid, 2'-(1,3-diphenylbutyl)bisphenol A-2-sulfonic acid, 6'-α-methylbenzylbisphenol A-2-sulfonic acid, 6'-(α,α-dimethylbenzyl)bisphenol A-2-sulfonic acid, 6'-[α-methyl-4'-(α-methylbenzyl)benzyl-bisphenol A-2-sulfonic acid, 6'-(1,3-diphenylbutyl)-bisphenol A-2-sulfonic acid, 6,6'-di(α-methylbenzyl)bisphenol A-2-sulfonic acid, 2',6-di(α,α-dimethylbenzyl)-bisphenol A-2-sulfonic acid, 6-(α-methylbenzyl)-6'-[α-methyl-4'-(α-methylbenzyl)benzyl]-bisphenol A-2-sulfonic acid, 6-(1,3-diphenylbutyl)-2'-(α,α-dimethylbenzyl)-bisphenol A-2-sulfonic acid and 6-[α-methyl-4'-(α-methylbenzyl)benzyl]bisphenol A-2,6'-disulfonic acid; sulfonated bisphenol B's such as bisphenol B-2-sulfonic acid, bisphenol B-6-sulfonic acid, bisphenol B-2,6-disulfonic acid, bisphenol B-2,2'-disulfonic acid, bisphenol B-2,6'-disulfonic acid, bisphenol B-2,2',6-trisulfonic acid and bisphenol B-2,2',6,6'-tetrasulfonic acid; styrene-substituted sulfonated bisphenol B's such as 6-(α-methylbenzyl)bisphenol B-2-sulfonic acid, 6-(α,α-dimethylbenzyl)bisphenol B-2-sulfonic acid, 6-[α-methyl-4'-(α-methylbenzyl)benzyl]-bisphenol B-2-sulfonic acid, 6-(1,3-diphenylbutyl)-bisphenol B-2-sulfonic acid, 2'-α-methylbenzyl-bisphenol B-2-sulfonic acid, 2'-(α,α-dimethylbenzyl)-bisphenol B-2-sulfonic acid, 2'-[α-methyl-4'-(α-methylbenzyl)benzyl]-bisphenol B-2-sulfonic acid, 2'-(1,3-diphenylbutyl)-bisphenol B-2-sulfonic acid, 6'-α-methylbenzyl-bisphenol B-2-sulfonic acid, 6'-(α,α-dimethylbenzyl)-bisphenol B-2-sulfonic acid, 6'-[α-methyl-4'-(α-methylbenzyl)benzyl-bisphenol B-2-sulfonic acid, 6'-(1,3-diphenylbutyl)-bisphenol B-2-sulfonic acid, 6,6'-α-methylbenzyl-bisphenol B-2-sulfonic acid, 2',6-(α,α-dimethylbenzyl)-bisphenol B-2-sulfonic acid, 6-(α-methylbenzyl)-6'-[α-methyl-4'-(α-methylbenzyl)benzyl]-bisphenol B-2-sulfonic acid, 6-(1,3-diphenylbutyl)-2'-(α,α-dimethylbenzyl)-bisphenol B-2-sulfonic acid and 6-[α-methyl-4'-(α-methylbenzyl)benzyl]bisphenol B-2,6'-disulfonic acid; sulfonated bisphenol F's such as bisphenol F-2-sulfonic acid, bisphenol F-6-sulfonic acid, bisphenol F-2,6-disulfonic acid, bisphenol F-2,2'-disulfonic acid, bisphenol F-2,6'-disulfonic acid, bisphenol F-2,2',6-trisulfonic acid and bisphenol F-2,2',6,6'-tetrasulfonic acid; styrene-substituted sulfonated bisphenol F's such as 6-(α-methylbenzyl)-bisphenol F-2-sulfonic acid, 6-(α,α-dimethylbenzyl)-bisphenol F-2-sulfonic acid, 6-[α-methyl-4'-(α-methylbenzyl)benzyl]-bisphenol F-2-sulfonic acid, 6-(1,3-diphenylbutyl)-bisphenol F-2-sulfonic acid, 2'-(α-methylbenzyl)-bisphenol F-2-sulfonic acid, 2'-(α,α-dimethylbenzyl)-bisphenol F-2-sulfonic acid, 2'-[α-methyl-4'-(α-methylbenzyl)benzyl]-bisphenol F-2-sulfonic acid, 2'-(1,3-diphenylbutyl)bisphenol F-2-sulfonic acid, 6'-α-methylbenzylbisphenol F-2-sulfonic acid, 6'-(α,α-dimethylbenzyl)bisphenol F-2-sulfonic acid, 6'-[α-methyl-4'-(α-methylbenzyl)benzyl]-bisphenol F-2-sulfonic acid, 6'-(1,3-diphenylbutyl)-bisphenol F-2-sulfonic acid, 6,6'-α-methylbenzyl-bisphenol F-2-sulfonic acid, 2',6-(α,α-dimethylbenzyl)-bisphenol F-2-sulfonic acid, 6-(α-methylbenzyl)-6'-[α-methyl-4'-(α-methylbenzyl)benzyl]-bisphenol F-2-sulfonic acid, 6-(1,3-diphenylbutyl)-2'-(α,α-dimethylbenzyl)-bisphenol F-2-sulfonic acid and 6-[α-methyl-4'-(α-methylbenzyl)benzyl]bisphenol F-2,6'-disulfonic acid; sulfonated 4,4'-dihydroxy-diphenyls such as 4,4'-dihydroxy-diphenyl-3-sulfonic acid, 4,4'-dihydroxy-diphenyl-5-sulfonic acid, 4,4'-dihydroxy-diphenyl-3,5-disulfonic acid, 4,4'-dihydroxy-diphenyl-3,3'-disulfonic acid, 4,4,-dihydroxy-diphenyl-3,5'-disulfonic acid, 4,4'-dihydroxy-diphenyl,3,3',5-trisulfonic acid and 4,4'-dihydroxy-diphenyl-3,3',5,5'-tetrasulfonic acid; styrene-substituted sulfonated 4,4'-dihydroxy-diphenyls such as 5-(α-methylbenzyl)-4,4'-dihydroxy-diphenyl-3-sulfonic acid, 5-(α,α-dimethylbenzyl)-4,4'-dihydroxy-diphenyl-3-sulfonic acid, 5-[α-methyl-4'-(α-methylbenzyl)benzyl]-4,4'-dihydroxy-diphenyl-3-sulfonic acid, 5-(1,3-diphenylbutyl)-4,4'-dihydroxy-diphenyl-3-sulfonic acid, 3'-(α-methylbenzyl)-4,4'-dihydroxy-diphenyl-3-sulfonic acid, 3'-(α,α-dimethylbenzyl)-4,4'-dihydroxy-diphenyl-3-sulfonic acid, 3'-[α-methyl-4'-(α-methylbenzyl)benzyl]-4,4'-dihydroxy-diphenyl-3-sulfonic acid, 3'-(1,3-diphenylbutyl)-4,4'-dihydroxy-diphenyl-3-sulfonic acid, 5'-(α-methylbenzyl)-4,4'-dihydroxy-diphenyl-3-sulfonic acid, 5'-(α,α-dimethylbenzyl)-4,4'-dihydroxy-diphenyl-3-sulfonic acid, 5'-[α-methyl-4'-(α-methylbenzyl)-benzyl]-4,4'-dihydroxy-diphenyl-3-sulfonic acid, 5'-(1,3-diphenylbutyl)-4,4'-dihydroxy-diphenyl-3-sulfonic acid, 5,5'-(α-methylbenzyl)-4,4'-dihydroxy-diphenyl-3-sulfonic acid, 3',5-(α,α-dimethylbenzyl)-4,4'-dihydroxy-diphenyl-3-sulfonic acid, 5-(α-methylbenzyl)-5'-[α-methyl-4'-(α-methylbenzyl)benzyl]-4,4'-dihydroxy-diphenyl-3-sulfonic acid, 5-(1,3-diphenylbutyl)-3'-(α,α-dimethylbenzyl)-4,4'-dihydroxy-diphenyl-2-sulfonic acid and 5-[α-methyl-4'-(α-methylbenzyl)benzyl]-4,4'-dihydroxy-diphenyl-3,5'-sulfonic acid; sulfonated 2,4'-dihydroxy-diphenyls such as 2,4'-dihydroxy-diphenyl-3-sulfonic acid, 2,4'-dihydroxy-diphenyl-5-sulfonic acid, 2,4'-dihydroxy-diphenyl-3'-sulfonic acid, 2,4'-dihydroxy-diphenyl-5'-sulfonic acid, 2,4'-dihydroxy-diphenyl-3,5-disulfonic acid, 2,4'-dihydroxy-diphenyl-3,3'-disulfonic acid, 2,4'-dihydroxy-diphenyl-3,5'-disulfonic acid, 2,4'-dihydroxy-diphenyl-3,5,5'-trisulfonic acid and 2,4'-dihydroxy-diphenyl-3,3',5,5'-tetrasulfonic acid; styrene-substituted sulfonated 2,4'-dihydroxy-diphenyls such as 5-(α-methylbenzyl)-2,4'-dihydroxy-diphenyl-3-sulfonic acid, 5-(α,α-dimethylbenzyl)-2,4'-dihydroxy-diphenyl-3-sulfonic acid, 5-[α-methyl-4'-(α-methylbenzyl)benzyl]-2,4'-dihydroxy-diphenyl-3-sulfonic acid, 5-(1,3-diphenylbutyl)-2,4'-dihydroxy-diphenyl-3-sulfonic acid, 3'-(α-methylbenzyl)-2,4'-dihydroxy-diphenyl-3-sulfonic acid, 3'-(α,α-dimethylbenzyl)-2,4'-dihydroxy-diphenyl-3-sulfonic acid, 3'-[α-methyl-4'-(α-methylbenzyl) benzyl]-2,4'-dihydroxy-diphenyl-3-sulfonic acid, 3'-(1,3-diphenylbutyl)-2,4'-dihydroxy-diphenyl-3-sulfonic acid, 5'-(α-methylbenzyl)-2,4'-dihydroxy-diphenyl-3-sulfonic acid, 5'-(α,α-dimethylbenzyl)-2,4'-dihydroxy-diphenyl-3-sulfonic acid, 5'-[α-methyl-4'-(α-methylbenzyl)-benzyl]-2,4'-dihydroxy-diphenyl-3-sulfonic acid, 5'-(1,3-diphenylbutyl)-2,4'-dihydroxy-diphenyl-3-sulfonic acid, 5,5'-(α-methylbenzyl)-2,4'-dihydroxy-diphenyl-3-sulfonic acid, 3',5-(α,α-dimethylbenzyl)-2,4'-dihydroxy-diphenyl-3-sulfonic acid, 5-(α-methylbenzyl)-5'-[α-methyl-4'-(α-methylbenzyl)benzyl]-2,4'-dihydroxy-diphenyl-3-sulfonic acid, 5-(1,3-diphenylbutyl)-3'-(α,α-dimethylbenzyl)-2,4'-dihydroxy-diphenyl-2-sulfonic acid, 5-[α-methyl-4'-(α-methylbenzyl)benzyl]-2,4'-dihydroxy-diphenyl-3,5'-sulfonic acid and 3,5-(α,α-dimethylbenzyl)-2,4'-dihydroxy-diphenyl-3,5'-sulfonic acid; sulfonated 2,2'-dihydroxy-diphenyls such as 2,2'-dihydroxy-diphenyl-3-sulfonic acid, 2,2'-dihydroxy-diphenyl-5-sulfonic acid, 2,2'-dihydroxy-diphenyl-3'-sulfonic acid, 2,2'-dihydroxy-diphenyl-5'-sulfonic acid, 2,2'-dihydroxy-diphenyl-3,5-disulfonic acid, 2,2'-dihydroxy-diphenyl-3,3'-disulfonic acid, 2,2'-dihydroxy-diphenyl-5,5'-disulfonic acid, 2,2'-dihydroxy-diphenyl-3,5'-disulfonic acid, 2,2'-dihydroxy-diphenyl-3,5, 5'-trisulfonic acid and 2,2'-dihydroxy-diphenyl-3,3',5,5'-tetrasulfonic acid; styrene-substituted sulfonated 2,2'-dihydroxy-diphenyls such as 5-(α-methylbenzyl)-2,2'-dihydroxy-diphenyl-3-sulfonic acid, 5-(α,α-dimethylbenzyl)-2,2'-dihydroxy-diphenyl-3'-sulfonic acid, 5-[α-methyl-4'-(α-methylbenzyl)benzyl]- 2,2'-dihydroxy-diphenyl-5'-sulfonic acid, 5-(1,3-diphenylbutyl)-2,2'-dihydroxy-diphenyl-5',3-sulfonic acid, 3'-(α-methylbenzyl) -2,2'-dihydroxy-diphenyl-5-sulfonic acid, 3'-(α,α-dimethylbenzyl)-2,2'-dihydroxy-diphenyl-5-sulfonic acid, 3'-[α-methyl-4'-(α-methylbenzyl)benzyl]-2,2'-dihydroxy-diphenyl-5'-sulfonic acid, 3'-(1,3-diphenylbutyl)-2,2'-dihydroxy-diphenyl-5-sulfonic acid, 5'-(α-methylbenzyl)-2, 2'-dihydroxy-diphenyl-5-sulfonic acid, 5'-(α,α-dimethylbenzyl)-2,2'-dihydroxy-diphenyl-5-sulfonic acid, 5'-[α-methyl-4'-(α-methylbenzyl)benzyl]-2,2'-dihydroxy-diphenyl-5-sulfonic acid, 5'-(1,3-diphenylbutyl)-2,2'-dihydroxy-diphenyl-5-sulfonic acid, 5,5'-(α-methylbenzyl)-2,2'-dihydroxy-diphenyl-3-sulfonic acid, 3',5-(α,α-dimethylbenzyl)-2,2'-dihydroxy-diphenyl-5'-sulfonic acid, 5-(α-methylbenzyl)-5'-[α-methyl-4'-(α-methylbenzyl) benzyl]-2,2'-dihydroxy-diphenyl-3-sulfonic acid, 5-(1,3-diphenylbutyl)-3'-(α,α-dimethylbenzyl)-2,2'-dihydroxy-diphenyl-5'-sulfonic acid, 5-[α-methyl-4'-(α-methylbenzyl) benzyl]-2,2'-dihydroxy-diphenyl-3,5'-disulfonic acid and 3,5-(α,α-dimethylbenzyl)-2,2'-dihydroxy-diphenyl-3,5'-disulfonic acid; sulfonated 4,4'-dihydroxy-3,3'-dipropyl-diphenyls such as 4,4'-dihydroxy-3,3'-dipropyl-diphenyl-5-sulfonic acid, 4,4'-dihydroxy-3,3'-dipropyl-diphenyl-5'-sulfonic acid and 4,4'-dihydroxy-3,3'-dipropyl-diphenyl-5, 5'-disulfonic acid; styrene-substituted sulfonated 4,4'-dihydroxy-3,3'-dipropyl-diphenyls such as 5-(α-methylbenzyl)-4,4'-dihydroxy-3,3'-dipropyl-diphenyl-5'-sulfonic acid, 5-(α,α-dimethylbenzyl)-α,α-dimethylbenzyl-diphenyl-5'-sulfonic acid, 5-[α-methyl-4'-(α-methylbenzyl) benzyl]-4,4'-dihydroxy-3,3'-dipropyl-diphenyl-5'-sulfonic acid, 5-(1,3-diphenylbutyl)-4,4'-dihydroxy-3,3'-dipropyl-diphenyl-5'-sulfonic acid, 5'-(α-methylbenzyl)-4,4'-dihydroxy-3,3'-dipropyl-diphenyl-5-sulfonic acid, 5'-(α,α-dimethylbenzyl)-4,4'-dihydroxy-3,3'-dipropyl-diphenyl-5-sulfonic acid, 5'-[α-methyl-4'-(α-methyl-benzyl)benzyl]-4, 4'-dihydroxy-3,3'-dipropyl-diphenyl-5-sulfonic acid and 5'-(1,3-diphenylbutyl)-4,4'-dihydroxy-3,3'-dipropyl-diphenyl-5-sulfonic acid; sulfonated 2,2'-dihydroxy-6,6'-dimethyl-diphenyls such as 2,2'-dihydroxy-6,6'-dimethyl-diphenyl-3-sulfonic acid, 2,2'-dihydroxy-6,6'-dimethyl-diphenyl-5-sulfonic acid, 2,2'-dihydroxy-6,6'-dimethyl-diphenyl-3'-sulfonic acid, 2,2'-dihydroxy-6,6'-dimethyl-diphenyl-5'-sulfonic acid, 2,2'-dihydroxy-6,6'-dimethyl-diphenyl-3,5-disulfonic acid, 2,2'-dihydroxy-6,6'-dimethyl-diphenyl-3,3'-disulfonic acid, 2,2'-dihydroxy-6,6'-dimethyl-diphenyl-5,5'-disulfonic acid, 2,2'-dihydroxy-6,6'-dimethyl-diphenyl-3,5'-disulfonic acid, 2,2'-dihydroxy-6,6'-dimethyl-diphenyl- 3,5, 5'-trisulfonic acid and 2,2'-dihydroxy-6,6'-dimethyl-diphenyl-3,3',5,5,-tetrasulfonic acid; styrene-substituted sulfonated 2,2'-dihydroxy-6,6'-dimethyl-diphenyls such as 5-(α-methylbenzyl)-2,2'-dihydroxy-6,6'-dimethyl-diphenyl-3-sulfonic acid, 5-(α,α-dimethylbenzyl)-2,2'-dihydroxy-6, 6'-dimethyl-diphenyl-3'-sulfonic acid, 5-[α-methyl-4'-(α-methylbenzyl)benzyl]-2,2'-dihydroxy-6,6,-dimethyl-diphenyl-5'-sulfonic acid, 5-(1,3-diphenylbutyl)-2,2'-dihydroxy-6,6'-dimethyl-diphenyl-5',3-sulfonic acid, 3'-(α-methylbenzyl)-2,2'-dihydroxy-6,6,-dimethyl-diphenyl-5-sulfonic acid, 3'-(α,α-dimethylbenzyl)-2,2'-dihydroxy-6,6'-dimethyl-diphenyl-5-sulfonic acid, 3'-[α-methyl-4'-(α-methylbenzyl)benzyl]-2,2'-dihydroxy-6,6'-dimethyl-diphenyl-5'-sulfonic acid, 3'-(1,3-diphenylbutyl)-2,2'-dihydroxy-6,6'-dimethyl-diphenyl-5-sulfonic acid, 5'-(α-methylbenzyl)-2,2'-dihydroxy-6,6'-dimethyl-diphenyl-5-sulfonic acid, 5'-(α,α-dimethylbenzyl)-2,2'-dihydroxy-6,6'-dimethyl-diphenyl-5-sulfonic acid, 5'-[α-methyl-4'-(α-methylbenzyl)benzyl]-2,2'-dihydroxy-6,6'-dimethyl-diphenyl-3-sulfonic acid, 5'-(1,3-diphenylbutyl)-2,2'-dihydroxy-6,6'-dimethyl-diphenyl-5-sulfonic acid, 5,5'-(α-methylbenzyl)-2,2'-dihydroxy-6,6'-dimethyl-diphenyl-3-sulfonic acid, 3',5-(α,α-dimethylbenzyl)-2,2'-dihydroxy-6,6'-dimethyl-diphenyl-5'-sulfonic acid, 5-(α-methylbenzyl) -5'-[α-methyl-4'-(methylbenzyl)benzyl]-2,2'-dihydroxy-6, 6'-dimethyl-diphenyl-3-sulfonic acid, 5-(1,3-diphenylbutyl) -3'-(α,α-dimethylbenzyl)-2,2,-dihydroxy-6,6'-dimethyl-diphenyl-5'-sulfonic acid, 5-[α-methyl-4'-(α-methylbenzyl) benzyl]-2,2'-dihydroxy-6,6'-dimethyl-diphenyl-3,5'-disulfonic acid and 3,5-di(α,α-dimethylbenzyl)-2,2'-dihydroxy-6,6'-dimethyl-diphenyl-3',5'-disulfonic acid; sulfonated catechols such as catechol-4-sulfonic acid, catechol-6-sulfonic acid and catechol-4,6-disulfonic acid; styrene-substituted sulfonated catechols such as 6-(α-methylbenzyl)-catechol-4-sulfonic acid, 6-(α,α-dimethylbenzyl)-catechol-4-sulfonic acid, 6-[α-methyl-4'-(α-methylbenzyl)benzyl]-catechol-4-sulfonic acid, 6-(1,3-diphenylbutyl)-catechol-4-sulfonic acid, 4-(α-methylbenzyl)-catechol-6-sulfonic acid, 4-(α,α-dimethylbenzyl)-catechol-6-sulfonic acid, 4-[α-methyl-4'-(α-methylbenzyl)benzyl]-catechol-6-sulfuric acid, and 4-(1, 3-diphenylbutyl)-catechol-6-sulfonic acid; sulfonated resorcins such as resorcin-2-sulfonic acid, resorcin-4-sulfonic acid, resorcin-6-sulfonic acid, resorcin-2,4-disulfonic acid, resorcin-2,6-disulfonic acid and resorcin-4, 6-disulfonic acid; styrene-substituted sulfonated resorcins such as 6-(α-methylbenzyl)-resorcin- 4-sulfonic acid, 6-(α, α-dimethylbenzyl)-resorcin-4-sulfonic acid, 6-[α-methyl-4'-(α-methylbenzyl)benzyl]-resorcin-4-sulfonic acid, 6-(1, 3-diphenylbutyl)-resorcin-4-sulfonic acid, 2-(α-methylbenzyl)-resorcin-4-sulfonic acid, 2-(α,α-dimethylbenzyl)-resorcin-4-sulfonic acid, 2-[α-methyl-4'-(α-methylbenzyl)benzyl]resorcin-4-sulfonic acid, 2-(1,3-diphenylbutyl)-resorcin-4-sulfonic acid, 2,6-di(α-methylbenzyl)-resorcin-4-sulfonic acid, 2,6-di(α,α-dimethylbenzyl)-resorcin-4-sulfonic acid, 2,6-di[α-methyl-4'-(α-methylbenzyl)benzyl]-resorcin-4-sulfonic acid, 2,6-di (1,3-diphenylbutyl)-resorcin-4-sulfonic acid, 4-(α-methylbenzyl)-resorcin-6-sulfonic acid, 4-(α,α-dimethylbenzyl)-resorcin-6-sulfonic acid, 4-[α-methyl-4'-(α-methylbenzyl)benzyl]-resorcin-6-sulfonic acid, 4-(1,3-diphenylbutyl)-resorcin-6-sulfonic acid, 2-(α-methylbenzyl)-resorcin-6-sulfonic acid, 2-(α,α-dimethylbenzyl)-resorcin-6-sulfonic acid, 2-[α-methyl-4'-(α-methylbenzyl)benzyl]-resorcin-6-sulfonic acid, 2-(1,3-diphenylbutyl)-resorcin-6-sulfonic acid, 2,4-di(α-methylbenzyl)-resorcin-6-sulfonic acid, 2,4-di(α,α-dimethylbenzyl)-resorcin-6-sulfonic acid, 2,4-di[α-methyl-4'-(α-methylbenzyl)benzyl]-resorcin-6-sulfonic acid, 2,4-di (1,3-diphenylbutyl)-resorcin-6-sulfonic acid, 6-(α-methylbenzyl)-resorcin-2-sulfonic acid, 6-(α,α-dimethylbenzyl)-resorcin- 2-sulfonic acid, 6-[α-methyl-4'-(α-methylbenzyl)benzyl]-resorcin-2-sulfonic, 6-(1,3-diphenylbutyl)-resorcin-2-sulfonic acid, 4-(α-methylbenzyl)-resorcin-2-sulfonic acid, 4-(α,α-dimethylbenzyl)-resorcin-2-sulfonic acid, 4-[α-methyl-4'-(α-methylbenzyl)benzyl]-resorcin-2-sulfonic acid, 4-(1,3-diphenylbutyl)-resorcin-2-sulfonic acid, 4,6-di(α-methylbenzyl)-resorcin-2-sulfonic acid, 4,6-di(α,α-dimethylbenzyl)-resorcin-2-sulfonic acid, 4,6-di[α-methyl-4'-(α-methylbenzyl)benzyl]-resorcin-2-sulfonic acid and 4,6-di(1,3-diphenylbutyl)-resorcin-2-sulfonic acid; sulfonated hydroquinones such as hydroquinone-2-sulfonic acid and hydroquinone-2,6-disulfonic acid; styrene-substituted sulfonated hydroquinones such as 2-(α-methylbenzyl)-hydroquinone-6-sulfonic acid, 2-(α,α-dimethylbenzyl)-hydroquinone-6-sulfonic acid, 2-[α-methyl-4'-(α-methylbenzyl)benzyl]-hydroquinone-6-sulfonic acid and 2-(1,3-diphenylbutyl)-hydroquinone-6-sulfonic acid; 2,6-dihydroxytoluene-4-sulfonic acid; 2-methylhydroquinone-6-sulfonic acid; 6-tert-butylcatechol-4-sulfonic acid; 2-tert-butylhydroquinone-6-sulfonic acid; 2-octylhydroquinone-6-sulfonic acid; 2-tridecylhydroquinone-6-sulfonic acid; and 2-pentadecylhydroquinone-6-sulfonic acid. The sulfonated phenol, however, should not be limited thereto. These sulfonated phenols can be used either singly or in combination.

Preferred examples include styrene-substituted sulfonated phenols which have each been obtained by reacting 1 to 10 moles of the corresponding styrene with 1 mole of the corresponding sulfonated phenol.

Examples of the metal, which forms the metal salt of the sulfonated phenol and is useful in the present invention, include monovalent to tetravalent metals such as sodium, potassium, zinc, calcium, magnesium, barium, lead, aluminum, zirconium, vanadium, and tin.

Illustrative of the phenol usable in the present invention include, in addition to phenol, such phenol derivatives will be described next. Specific examples include, but are not limited to, phenylphenols such as o-phenylphenol, m-phenylphenol and p-phenylphenol; alkyl- and aralkylphenols such as m-cresol, o-ethylphenol, p-isopropylphenol, p-tert-butylphenol, p-cyclohexylphenol, p-tert-octylphenol, nonylphenol, p-decylphenol, 2,4-xylenol, 2,4-di-tert-butylphenol, 2-methyl-4-nonylphenol, cumylphenol, p-benzylphenol, phenylethylphenol and 2,4-dimethylbenzylphenol; and diphenols and polyphenols such as bisphenol A, bisphenol B, bisphenol F, 4,4'-dihydroxy-diphenyl, 2,4'-dihydroxydiphenyl, 2,2'-dihydroxy-diphenyl, 4,4'-dihydroxy-3,3'-dipropyl-diphenyl, 2,2'-dihydroxy-6,6'-dimethyldiphenyl, catechol, resorcin, hydroquinone, 2,6-dihydroxytoluene, 2-methylhydroquinone, tert-butylcatechol, 2-tert-butylhydroquinone, 2-octylhydroquinone, 2-tridecylhydroquinone, 2-pentadecylhydroquinone, 2,5-dibutylhydroquinone, 2,6-ditridecylhydroquinone, 2,3,6-trimethylhydroquinone, 1,2, 3-trihydroxybenzene, and 1,3,5-trihydroxybenzene. These phenols can be used either singly or in combination.

Examples of the salicylic acid usable in the present invention include, but are not limited to, salicylic acid, 3-methylsalicylic acid, 4-methylsalicylic acid, 5-methylsalicylic acid, 3-n-butylsalicylic acid, 6-methylsalicylic acid, 5-isopropylsalicylic acid, 4-n-pentylsalicylic acid, 5-cyclohexylsalicylic acid, 5-n-octylsalicylic acid, 5-tert-octylsalicylic acid, 5-nonylsalicylic acid, 4-n-dodecylsalicylic acid, 4-methoxysalicylic acid, 6-methoxysalicylic acid, 5-ethoxysalicylic acid, 6-isopropoxysalicylic acid, 4-n-hexyloxysalicylic acid, 4-n-decyloxysalicylic acid, 5-fluorosalicylic acid, 3-chlorosalicylic acid, 4-chlorosalicylic acid, 5-chlorosalicylic acid and 5-bromosalicylic acid. In the process of the present invention, these salicylic acids can also be used in the form of their esters, although a hydrolysis process becomes necessary. These salicylic acids can be used either singly or in combination. Preferred are salicylic acid and alkyl-substituted salicylic acids such as 3-methylsalicylic acid.

As a production process of the color-developing agent according to the present invention, it may be mentioned, for example, to mix the multivalent metal salt of the salicylic acid derivative and the sulfonated phenol and/or the metal salt thereof as solutions or melts after separately synthesizing them by methods known per se in the art.

Where the salicylic acid derivative is a styrene-substituted salicylic acid derivative, the color-developing agent can be produced, for example, by reacting the corresponding styrene with the corresponding salicylic acid and phenol in the presence of sulfuric acid as a catalyst and sulfonating agent to obtain a resin and then reacting the corresponding multivalent metal salt with the resin. This process permits easy production under mild conditions and is hence preferred especially from the industrial viewpoint. Therefore the present invention also include, for example, the following processes:

(1) A process for the production of a color-developing agent comprising a multivalent metal salt of a styrene-substituted salicylic acid derivative and a styrene-substituted sulfonated phenol and/or a metal salt thereof, which comprises reacting a styrene with a salicylic acid and a phenol in the presence of sulfuric acid to obtain a resin and then reacting a multivalent metal compound with the resin (hereinafter called the "one-step process").

(2) A process as described above under (1), wherein the phenol is used in an amount of 0.5 to 40 mole % based on the salicylic acid.

(3) A process as described above under (1), wherein the styrene is used in an amount 1 to 10 molar times as much as the phenol and salicylic acid.

In the above one-step process, the phenol is used preferably in an amount of 0.5 to 40 mole %, with 1 to 30 mole % being particularly preferred, on the basis of the salicylic acid. The range of from 0.5 to 40 mole % is excellent in both initial and ultimate color-producing capacities. Although no particular limitation is imposed on the amount of the styrene to be used, the styrene can be used in an amount, preferably about 1 to 10 molar times, more preferably about 1.5 to 8 molar times, most preferably about 2 to 6 molar times as much as the phenol and salicylic acid.

The sulfuric acid employed in the one-step process of the present invention serves as a reaction catalyst for the salicylic acid and the styrene and also for the phenol and the styrene and also as a sulfonating agent for the phenol. The sulfuric acid can be used in an amount at least equimolar to, more preferably of from 100 to 200 mole % based on the phenol and also of from 10 to 200 wt. %, more preferably from 20 to 100 wt. % based on the salicylic acid. Further, the concentration of the sulfuric acid may preferably be at least about 90 wt. %, with 97 wt. % or higher being particularly preferred. Fuming sulfuric acid can be used in combination.

The one-step process can be carried out in the presence of an organic solvent although use of such an organic solvent is not essential. Any organic solvent can be used as desired insofar as it is inert to the reactions. Illustrative of the organic solvent include, but are not limited to, hydrocarbon solvents such as hexane, octane, decane, cyclohexane, benzene, toluene and xylene; and halogenated hydrocarbon solvents such as dichloromethane, 1,2-dichloroethane, tetrachloromethane, 1,1-dichloroethane, 1,1,1-trichloroethane, 1,1,2-trichloroethane, chlorobenzene, o-dichlorobenzene, m-dichlorobenzene, p-dichlorobenzene, 1,2,4-trichlorobenzene, o-chlorotoluene, m-chlorotoluene and p-chlorotoluene. These solvents can be used either singly or in combination.

Although no particular limitation is imposed on the amount of the organic solvent to be used, its use in a large amount itself merely leads to reduced work efficiency and production efficiency. In general, the organic solvent can be used preferably in an amount 100 or smaller (volume/weight) times as much as the weight of the salicylic acid and the phenol.

The styrene can be fed either continuously or intermittently at plural stages by conventional means or device (for example, one of various continuous dropping devices and various fixed displacement pumps). Needless to say, any other modified method can of course be used insofar as it can be practiced from the standpoint of process engineering can be used.

Upon feeding the styrene, the styrene can be fed as is or as a solution in the organic solvent mentioned above.

When the styrene is added to the salicylic acid and the phenol in the presence of sulfuric acid, the styrene can be fed at such a feeding rate that its feeding can be completed in about 0.5 to about 15 hours, preferably about 1 to about 10 hours, although no particular limitation is imposed thereon.

Upon practice of the one-step process according to the present invention, the reaction temperature is preferably lower than 60° C. but not lower than −20° C., with 10° to 50° C. being more preferred.

When the reaction temperature is lower than 60° C. but not lower than −20° C., the resulting color-developing agent can be easily converted into fine particles upon dispersion and after the dispersion, the water dispersion has excellent stability. Although the above reaction can be practiced under atmospheric pressure, it can also be practiced under either a reduced pressure or an elevated pressure.

The resin, which has been obtained by reacting the styrene to the salicylic acid and the phenol in the presence of sulfuric acid as described above, can be used in the subsequent reaction with the multivalent metal compound either after taking it out of the reaction system by a method known per se in the art or continuously without taking it out of the reaction system. The reaction with the multivalent metal compound is similar to the reaction in the above-mentioned production process of the multivalent metal salt of the salicylic acid derivative.

Upon practice of the present invention, it is also possible to charge sulfuric acid, the phenol and, if desired, an organic solvent in predetermined amounts in a reaction vessel, to add a predetermined amount of the styrene to the resultant mixture, to add a predetermined amount of the salicylic acid to the reaction mixture from the first step, and then to add a predetermined amount of styrene. Namely, the present invention also provides the following processes:

(1) A process for the production of a color-developing agent comprising a multivalent metal salt of a styrene-substituted salicylic acid derivative and a styrene-substituted sulfonated phenol or a metal salt thereof, which comprises conducting a first-stage reaction of reacting a phenol and a styrene in the presence of sulfuric acid and then a second-stage reaction of adding, to the resulting reaction mixture, a salicylic acid and then the styrene to obtain a resin, followed by the reaction of the resin with a multivalent metal salt (hereinafter called the "two-step process").

(2) A process as described above under (1), wherein the phenol is used in an amount of 0.5 to 40 mole % based on the salicylic acid used in the second stage reaction.

(3) A process as described above under (1), wherein the styrene used in the first-stage reaction is in an amount 1 to 10 molar times as much as the phenol.

(4) A process as described above under (1), wherein the total amount of the styrene used in the first-stage and second-stage reactions is 1 to 15 times as much as that of the phenol and salicylic acid.

Although no particular limitation is imposed on the amount of the styrene to be employed in the two-step process, it can be used in the first-stage reaction in an amount preferably about 1 to 10 molar times, more preferably about 1.5 to 8 molar times, most preferably about 2 to 6 molar times as much as the phenol in view of balancing of various physical properties such as color-producing ability, waterproofness and light fastness. Based on the total amount of the phenol and the salicylic acid, its amount is preferably from about 1 to 15 molar times, more preferably from about 1.5 to 8 times.

In this two-step process, sulfuric acid serves as a sulfonating agent for the phenol and also as a reaction catalyst for the phenol and the styrene in the first-stage reaction, and acts as a reaction catalyst for the salicylic acid and the styrene and also for the reaction product of the first-stage reaction and the styrene. The amount and concentration of sulfuric acid are similar to the corresponding conditions for the single-step process. The two-step process can be practiced in the presence of an organic solvent although use of such an organic solvent is not essential. The kind and amount of the organic solvent are similar to the corresponding conditions for the single-step process.

The reaction temperature is similar to the corresponding condition for the single-step process in both the first-stage and second-stage reactions. As has been described above, the resin obtained in accordance with the two-step process can be taken out of the reaction system by a method known per se in the art. Alternatively, the resin can be provided, as is, for the subsequent reaction with the multivalent metal compound without taking it out of the reaction system. The reaction with the multivalent metal compound is similar to the above-described process for the preparation of the multivalent metal salt of the salicylic acid derivative.

Upon feeding the styrene to the phenol in the presence of sulfuric acid in the first-stage reaction, no particular limitation is imposed on the feeding rate. It is however preferred to feed the styrene at such a rate that its feeding can be completed in about 0.2 to about 15 hours, more preferably in about 0.5 to about 5 hours. Upon feeding the styrene subsequent to the charging of the salicylic acid in the second-stage reaction, no particular limitation is imposed either on its feeding rate, although the styrene can preferably be fed at such a rate that its feeding can be completed in about 0.5 to about 15 hours, more preferably in about 1 to about 10 hours. Further, the styrene can be fed in a manner and form similar to those in the single-step process in both the first-stage and second-stage reactions.

In the production of the color-developing sheet according to the present invention, the color-developing agent according to the present invention can be used, to an extent not preventing desired effects of the present invention, in combination with a salicylic acid derivative and/or a sulfonated phenol synthesized separately and also with one or more known color-developing agents, for example, acid clay minerals such as acid clay, activated clay, attapulgite and bentonite, phenol resins such as phenol-formaldehyde resins and phenol-salicylic acid-formaldehyde resins, and metal salts, such as the zinc salts, of aromatic carboxylic acids such as phthalic acid and salicylic acid. Upon preparation of a dispersion of the color-developing agent, a known dispersing method can be applied. For example, the color-developing agent can be ground and dispersed to particle sizes of usually 3 μm or smaller, preferably 2 μm or smaller in the presence of a binder, a pigment and the like in water by means such as a ball mill, attritor or sand grinder.

Although no particular limitation is imposed on the binder, usable exemplary binders include, as water-soluble binders, polyvinyl alcohol, casein, starch and its derivatives, methylcellulose, ethylcellulose, carboxymethylcellulose, carboxyethylcellulose, hydroxyethylcellulose and polyacrylamide. Further, for example, water-insoluble binders such as synthetic rubber latexes or synthetic rubber emulsions of styrene-butadiene-acrylic compound copolymers, vinyl chloride-vinyl acetate copolymers, ethylene-vinyl acetate copolymers polyurethanes, poly(acrylate esters) and poly (butyl methacrylate).

Usable examples of the pigment include zinc oxide, zinc carbonate, calcium carbonate, magnesium carbonate, barium carbonate, magnesium sulfate, barium sulfate, titanium oxide, talc, kaolin, diatomaceous earth, aluminum hydroxide, magnesium hydroxide, alumina and silica.

To improve dispersion properties of the dispersion, it is also possible to add one or more of various known dispersants, for example, alkali metal salts, alkaline earth metal salts and ammonium salts of sulfonated products of polymers such as polystyrene, styrene-maleic anhydride copolymers, styrene-acrylic acid copolymers and styrene-methacrylic acid copolymers.

The dispersion may also be added, as needed, with one or more of various additives (for example, ultraviolet absorbents, defoaming agents, surfactants, pH regulators, viscosity modifiers, plasticizers, and organic high-molecular compounds). Other known dispersing methods can also be adopted. Namely, the color-developing agent is dissolved in an organic solvent such as toluene, methyl ethyl ketone, ethyl acetate or ethylene dichloride and, if necessary, a water-soluble solvent such as methyl alcohol, ethyl alcohol, acetone or dioxane can be added to the above-prepared solution. In the presence of a dispersant such as a water-soluble high-molecular substance or a surfactant, the resulting mixture is strongly agitated in a homomixer, a high-pressure homogenizer or the like to convert the color-developing agent into fine particles of about 0.1 to 2 μm, followed by the elimination of the organic solvent through evaporation. The dispersion so prepared is then coated on a base material (for example, paper, a plastic sheet, synthetic paper, or a composite sheet thereof) by a coating apparatus such as an air knife coater, a blade coater, a sizing press coater or a flood coater to form a color-developing agent layer so that a color-developing sheet can be produced.

Although no particular limitation is imposed on the weight (coat weight) of the color-developing agent layer on the base material, the color-developing agent can be applied preferably in an amount of 0.5 g/m$^2$ or more, preferably 0.5 to 10 g/m$^2$ in terms of dry weight. Further, the proportion of the color-developing agent of the present invention in the color-developing agent layer is preferably 5 wt. % or higher, more preferably from 5 to 70 wt. %.

Where the base material is paper, it is also possible to incorporate the color-developing agent upon making the paper. As a further alternative, the color-developing agent can be either dissolved or suspended in an organic solvent to prepare a coating formulation, followed by the coating of a base material with the coating formulation.

Although no particular limitation is imposed on the form of the color-developing sheet according to the present invention, illustrative forms include:

(1) a CF-sheet for use in combination with a CB-sheet coated on the back side thereof with microcapsules containing an electron-donating chromogenic compound and a capsule oil, (2) a CF/CB-sheet provided with a color-developing agent layer on a front side of the sheet and a microcapsule layer on a rear side of the sheet so that it can inserted between a CB-sheet and a CF sheet to obtain plural copies, and (3) a self-contained copying sheet with both microcapsules and a color-developing agent coated on the same side of the sheet.

In the self-contained copying sheet as one of the above-described forms of the color-developing sheet according to the present invention, the microcapsules can be produced by dissolving an electron-donating chromogenic compound in a capsule oil and then subjecting the resultant solution, for example, to coacervation.

Illustrative of the electron-donating chromogenic compound includes various known compounds such as triarylmethane compounds, diarylmethane compounds, Rhodamine-lactam compounds, fluoran compounds, indolylphthalide compounds, pyridine compounds, spiro compounds, fluorene compounds and phenothiazine compounds.

Usable examples of the capsule oil include various oils such as cotton seed oil, castor oil, kerosene, paraffin, chlorinated paraffin, naphthene oil, alkylated biphenyls, alkylated terphenyls, alkylated naphthalenes, diarylalkanes, hydrogenated terphenyl and dialkyl phthalates. These capsule oils can be used either singly or in combination.

The present invention will hereinafter be described in further detail by the following examples. It should however be borne in mind that the present invention is not limited to or by these examples.

EXAMPLE 1

Production of color-developing agent

A glass-made reaction vessel was charged with 27.6 g (0.20 mole) of salicylic acid, 12.1 g (43 wt. % based on the salicylic acid, calculated as 100% sulfuric acid) of 98% sulfuric acid and 50 g of 1,2-dichloroethane. While maintaining the resultant solution at 45° C. under stirring, 62.5 g (0.6 mole) of styrene were fed over 8 hours through a dropping funnel. After the feeding, stirring was conducted at the same temperature for additional 2 hours, followed by the addition of water. The mixture so obtained was neutralized with an aqueous solution of sodium hydroxide. Further, 6.0 g (0.02 mole) of 2-hydroxy-5-nonyl-benzenesulfonic acid were added and after mixing, 1,2-dichloroethane was distilled off. The aqueous solution was added dropwise over 3 hours into 217.4 g of a 12.6 wt. % aqueous solution of zinc sulfate heptahydrate, the latter aqueous solution having been maintained at 20° C. or lower, and the resulting mixture was stirred for 2 hours. Thereafter, the reaction product was caused to coagulate at 30° C., collected by filtration, washed with water and then dried, whereby 99.1 g of a color-developing agent were obtained as white crystals.

Production and evaluation of color-developing sheet

1. Preparation of dispersion

Using the above-described color-developing agent, a mixture of the below-described composition was processed at 25° C. for 4 hours in a sand grinder so that a dispersion of the color-developing agent was obtained.

| | |
|---|---|
| Color-developing agent | 50 g |
| Sodium salt of sulfonated polystyrene | 2 g |
| Water | 120 g |

2. Preparation of coating formulation

Using the above-described dispersion, a coating formulation of the following composition was prepared.

| | |
|---|---|
| Dispersion | 8.0 g |
| Light calcium carbonate | 30 g |
| Starch | 0.8 g |
| Synthetic rubber latex | 0.8 g |
| Water | 77.4 g |

3. Production of color-developing sheets (CF-sheets)

The above coating formulation was coated on a wood-free paper web (50 g/m$^2$) to give a dry coat weight of 5.0 g/m$^2$. The thus-coated paper web was dried to produce color-developing sheets (CF-sheets).

4. Evaluation of color-developing sheets for pressure-sensitive paper (1) Measurement of produced color densities Measurement of each produced color density was conducted in a room air-conditioned at 20° C. and 65%RH.

A commercial CB-sheet for producing a blue color ["N-40", trade name; product of Mitsubishi Paper Mills, Ltd.], which was coated with microcapsules containing Crystal Violet lactone (CVL) as a principal electron-donating chromogenic compound, and each pressure-sensitive copying color-developing sheet (CF-sheet) obtained by the above-described method were brought into a contiguous relation at their coated sides, and are then passed between rollers so that the color was developed under a nip pressure.

Upon elapsed times of 10 seconds and 24 hours after the application of the nip pressure, the density of the thus-developed color was measured.

The density of each color so produced was measured using a Σ-80 differential colorimeter and was indicated by a Y value. A smaller Y value indicates development of the color at a higher density.

(2) Waterproofness test of produced color images

After each color-developing sheet with the color developed in the manner described above under (1) was immersed for 24 hours in water of 20° C., the density of the color image was measured using the Σ-80 differential colorimeter and was indicated by a Y value. The smaller the Y value and the smaller the difference from the Y value before the test, the better the waterproofness of the produced color image.

The results of the evaluation are collectively presented in Table 9, along with the results of evaluations in the below-described examples and comparative examples.

In each of the following examples and comparative examples, only the production of the color-developing agent will be described. The production and evaluation of the color-developing sheet were conducted as in Example 1.

EXAMPLE 2

A glass-made reaction vessel was charged with 26.2 g (0.19 mole) of salicylic acid, 0.9 g (0.01 mole) of phenol, 12.1 g of 98% sulfuric acid and 50 g of 1,2-dichloroethane. While maintaining the resultant solution at 45° C. under stirring, 62.5 g (0.6 mole) of styrene were fed over 8 hours through a dropping funnel. After the feeding, stirring was conducted at the same temperature for additional 2 hours, followed by the addition of water. The mixture so obtained was neutralized with an aqueous solution of sodium hydroxide, and 1,2-dichloroethane was distilled off. The aqueous solution was added dropwise over 3 hours into 217.4 g of a 12.6 wt. % aqueous solution of zinc sulfate heptahydrate, the latter aqueous solution having been maintained at 20° C. or lower, and the resulting mixture was stirred for 2 hours. Thereafter, the reaction product was caused to coagulate at 30° C., collected by filtration, washed with water and then dried, whereby 94.0 g of a color-developing agent were obtained as white crystals.

The thus-obtained color-developing agent was analyzed by high-performance liquid chromatography. As a result, the color-developing agent was confirmed to contain, in addition to a salicylic acid derivative and a styrene polymer, 1.0 wt. % (0.54 mole % based on the salicylic acid derivative) of hydroxybenzenesulfonic acid, 2.3 wt. % (4.09 mole % based on the salicylic acid derivative) of α-methylbenzyl-hydroxybenzenesulfonic acid and 0.4 wt. % (0.52 mole % based on the salicylic acid derivative) of di(α-methylbenzyl)-hydroxybenzenesulfonic acid.

EXAMPLES 3–7

In a similar manner to Example 2 except that the amounts of the salicylic acid and phenol were changed as shown in Table 1, color-developing agents of the present invention were obtained.

TABLE 1

| | Salicylic acid (SA) | | Phenol | | Phenol/SA | Styrene | | Sulfuric acid | Color-developing agent |
|---|---|---|---|---|---|---|---|---|---|
| | g | (mole) | g | (mole) | (molar ratio × 100) | g | (mole) | g | g |
| Example 3 | 27.49 | (0.1990) | 0.09 | (0.0010) | 0.5 | 62.5 | (0.60) | 12.1 | 94.5 |
| Example 4 | 26.82 | (0.1942) | 0.55 | (0.0058) | 3 | 62.5 | (0.60) | 12.1 | 94.3 |
| Example 5 | 25.11 | (0.1818) | 1.71 | (0.0182) | 10 | 62.5 | (0.60) | 12.1 | 96.0 |
| Example 6 | 21.24 | (0.1538) | 4.35 | (0.0462) | 30 | 62.5 | (0.60) | 12.1 | 98.4 |
| Example 7 | 19.74 | (0.1429) | 5.37 | (0.0571) | 40 | 62.5 | (0.60) | 12.1 | 98.1 |

EXAMPLES 8–13

In a similar manner to Example 2 except that phenol was replaced by p-phenylphenol and the raw materials were used in a ratio as shown in Table 2, color-developing agents of the present invention were obtained.

TABLE 2

| | Salicylic acid (SA) | | p-Phenyl-phenol | | PPP/SA | Styrene | | Sulfuric acid | Color-developing agent |
|---|---|---|---|---|---|---|---|---|---|
| | g | (mole) | g | (mole) | (molar ratio × 100) | g | (mole) | g | g |
| Example 8 | 27.49 | (0.1990) | 0.17 | (0.0010) | 0.5 | 62.5 | (0.60) | 12.1 | 94.6 |
| Example 9 | 26.82 | (0.1942) | 0.99 | (0.0058) | 3 | 62.5 | (0.60) | 12.1 | 94.8 |
| Example 10 | 26.24 | (0.1900) | 1.70 | (0.0100) | 5.26 | 62.5 | (0.60) | 12.1 | 94.8 |
| Example 11 | 25.11 | (0.1818) | 3.10 | (0.0182) | 10 | 62.5 | (0.60) | 12.1 | 97.4 |
| Example 12 | 21.24 | (0.1538) | 7.86 | (0.0462) | 30 | 62.5 | (0.60) | 12.1 | 101.9 |
| Example 13 | 19.74 | (0.1429) | 9.72 | (0.0571) | 40 | 62.5 | (0.60) | 12.1 | 102.5 |

EXAMPLES 14–19

In a similar manner to Example 2 except that o-phenylphenol was used instead of phenol and the raw materials were used in a ratio as shown in Table 2, color-developing agents of the present invention were obtained.

TABLE 3

| | Salicylic acid (SA) | | o-Phenyl-phenol | | OPP/SA | Styrene | | Sulfuric acid | Color-developing agent |
|---|---|---|---|---|---|---|---|---|---|
| | g | (mole) | g | (mole) | (molar ratio × 100) | g | (mole) | g | g |
| Example 14 | 27.49 | (0.1990) | 0.17 | (0.0010) | 0.5 | 62.5 | (0.60) | 12.1 | 95.0 |
| Example 15 | 26.82 | (0.1942) | 0.99 | (0.0058) | 3 | 62.5 | (0.60) | 12.1 | 94.8 |
| Example 16 | 26.24 | (0.1900) | 1.70 | (0.0100) | 5.26 | 62.5 | (0.60) | 12.1 | 95.2 |
| Example 17 | 25.11 | (0.1818) | 3.10 | (0.0182) | 10 | 62.5 | (0.60) | 12.1 | 98.0 |
| Example 18 | 21.24 | (0.1538) | 7.86 | (0.0462) | 30 | 62.5 | (0.60) | 12.1 | 103.2 |
| Example 19 | 19.74 | (0.1429) | 9.72 | (0.0571) | 40 | 62.5 | (0.60) | 12.1 | 104.1 |

EXAMPLE 20

In a similar manner to Example 5 except that m-phenylphenol was used (in an amount of 10 mole % based on the salicylic acid) instead of phenol, color-developing agent of the present invention was obtained in an amount of 98.5 g.

EXAMPLES 21–26

In a similar manner to Example 2 except that cumylphenol was used in lieu of phenol and the raw materials were used in a ratio as shown in Table 4, color-developing agents of the present invention were obtained.

EXAMPLES 33–38

In a similar manner to Example 2 except that bisphenol A was used in place of phenol and the raw materials were used in a ratio as shown in Table 6, color-developing agents of the present invention were obtained.

TABLE 4

| | Salicylic acid (SA) | | Cumylphenol | | Cumylphenol/SA | Styrene | | Sulfuric acid | Color-developing agent |
|---|---|---|---|---|---|---|---|---|---|
| | g | (mole) | g | (mole) | (molar ratio × 100) | g | (mole) | g | g |
| Example 21 | 27.49 | (0.1990) | 0.21 | (0.0010) | 0.5 | 62.5 | (0.60) | 12.1 | 94.6 |
| Example 22 | 26.82 | (0.1942) | 1.23 | (0.0058) | 3 | 62.5 | (0.60) | 12.1 | 95.0 |
| Example 23 | 26.24 | (0.1900) | 2.12 | (0.0100) | 5.26 | 62.5 | (0.60) | 12.1 | 95.3 |
| Example 24 | 25.11 | (0.1818) | 3.86 | (0.0182) | 10 | 62.5 | (0.60) | 12.1 | 98.2 |
| Example 25 | 21.24 | (0.1538) | 9.81 | (0.0462) | 30 | 62.5 | (0.60) | 12.1 | 106.0 |
| Example 26 | 19.74 | (0.1429) | 12.12 | (0.0571) | 40 | 62.5 | (0.60) | 12.1 | 104.9 |

EXAMPLES 27–32

In a similar manner to Example 2 except that nonylphenol was used instead of phenol and the raw materials were used in a ratio as shown in Table 5, color-developing agents of the present invention were obtained.

TABLE 5

| | Salicylic acid (SA) | | Nonylphenol | | Nonylphenol/SA | Styrene | | Sulfuric acid | Color-developing agent |
|---|---|---|---|---|---|---|---|---|---|
| | g | (mole) | g | (mole) | (molar ratio × 100) | g | (mole) | g | g |
| Example 27 | 27.49 | (0.1990) | 0.22 | (0.0010) | 0.5 | 62.5 | (0.60) | 12.1 | 94.8 |
| Example 28 | 26.82 | (0.1942) | 1.29 | (0.0058) | 3 | 62.5 | (0.60) | 12.1 | 95.0 |
| Example 29 | 26.24 | (0.1900) | 2.20 | (0.0100) | 5.26 | 62.5 | (0.60) | 12.1 | 95.3 |
| Example 30 | 25.11 | (0.1818) | 4.01 | (0.0182) | 10 | 62.5 | (0.60) | 12.1 | 98.3 |
| Example 31 | 21.24 | (0.1538) | 10.18 | (0.0462) | 30 | 62.5 | (0.60) | 12.1 | 104.2 |
| Example 32 | 19.74 | (0.1429) | 12.58 | (0.0571) | 40 | 62.5 | (0.60) | 12.1 | 105.3 |

TABLE 6

| | Salicylic acid (SA) | | Bisphenol A | | Bisphenol A/SA | Styrene | | Sulfuric acid | Color-developing agent |
|---|---|---|---|---|---|---|---|---|---|
| | g | (mole) | g | (mole) | (molar ratio × 100) | g | (mole) | g | g |
| Example 33 | 27.49 | (0.1990) | 0.23 | (0.0010) | 0.5 | 62.5 | (0.60) | 12.1 | 94.6 |
| Example 34 | 26.82 | (0.1942) | 1.32 | (0.0058) | 3 | 62.5 | (0.60) | 12.1 | 95.1 |
| Example 35 | 26.24 | (0.1900) | 2.28 | (0.0100) | 5.26 | 62.5 | (0.60) | 12.1 | 95.4 |
| Example 36 | 25.11 | (0.1818) | 4.16 | (0.0182) | 10 | 62.5 | (0.60) | 12.1 | 98.5 |
| Example 37 | 21.24 | (0.1538) | 10.55 | (0.0462) | 30 | 62.5 | (0.60) | 12.1 | 104.6 |
| Example 38 | 19.74 | (0.1429) | 13.06 | (0.0571) | 40 | 62.5 | (0.60) | 12.1 | 105.8 |

EXAMPLES 39–44

In a similar manner to Example 2 except that phenol was replaced by 4,4'-dihydroxy-diphenyl and the raw materials were used in a ratio as shown in Table 7, color-developing agents of the present invention were obtained.

TABLE 7

| | Salicylic acid (SA) | | 4,4'-dihydroxy-diphenyl | | 4,4'-dihydroxy-diphenyl/SA | Styrene | | Sulfuric acid | Color-developing agent |
|---|---|---|---|---|---|---|---|---|---|
| | g | (mole) | g | (mole) | (molar ratio × 100) | g | (mole) | g | g |
| Example 39 | 27.49 | (0.1990) | 0.19 | (0.0010) | 0.5 | 62.5 | (0.60) | 12.1 | 95.0 |
| Example 40 | 26.82 | (0.1942) | 1.08 | (0.0058) | 3 | 62.5 | (0.60) | 12.1 | 94.8 |
| Example 41 | 26.24 | (0.1900) | 1.86 | (0.0100) | 5.26 | 62.5 | (0.60) | 12.1 | 95.1 |
| Example 42 | 25.11 | (0.1818) | 3.39 | (0.0182) | 10 | 62.5 | (0.60) | 12.1 | 97.7 |
| Example 43 | 21.24 | (0.1538) | 8.60 | (0.0462) | 30 | 62.5 | (0.60) | 12.1 | 102.7 |
| Example 44 | 19.74 | (0.1429) | 10.69 | (0.0571) | 40 | 62.5 | (0.60) | 12.1 | 103.4 |

EXAMPLES 45–50 & COMPARATIVE EXAMPLE 1

In a similar manner to Example 2 except that hydroquinone was used in lieu of phenol and the raw materials were used in a ratio as shown in Table 8, color-developing agents of the present invention were obtained.

TABLE 8

| | Salicylic acid (SA) | | Hydroquinone | | Hydroquinone/SA | Styrene | | Sulfuric acid | Color-developing agent |
|---|---|---|---|---|---|---|---|---|---|
| | g | (mole) | g | (mole) | (molar ratio × 100) | g | (mole) | g | g |
| Example 45 | 27.49 | (0.1990) | 0.11 | (0.0010) | 0.5 | 62.5 | (0.60) | 12.1 | 94.5 |
| Example 46 | 26.82 | (0.1942) | 0.88 | (0.0058) | 3 | 62.5 | (0.60) | 12.1 | 94.6 |
| Example 47 | 26.24 | (0.1900) | 1.10 | (0.0100) | 5.26 | 62.5 | (0.60) | 12.1 | 94.2 |
| Example 48 | 25.11 | (0.1818) | 2.00 | (0.0182) | 10 | 62.5 | (0.60) | 12.1 | 96.3 |
| Example 49 | 21.24 | (0.1538) | 5.09 | (0.0462) | 30 | 62.5 | (0.60) | 12.1 | 99.0 |
| Example 50 | 19.74 | (0.1429) | 6.29 | (0.0571) | 40 | 62.5 | (0.60) | 12.1 | 98.9 |
| Comp. Ex. 1 | 27.6 | (0.2) | | — | — | 62.5 | (0.60) | 12.1 | 95.2 |

EXAMPLE 51

A glass-made reaction vessel was charged with 2.1 g (0.01 mole) of cumylphenol, 12.1 g (45 wt. % based on the salicylic acid, calculated as 100% sulfuric acid) of 98% sulfuric acid and 50 g of 1,2-dichloroethane. While maintaining the resultant solution at 30° C. under stirring, 2.6 g (0.025 mole) of styrene were fed over 0.5 hour through a dropping funnel, followed by stirring for additional 1 hour at the same temperature. Further, 26.2 g (0.19 mole) of salicylic acid were charged into the reaction vessel and then 59.9 g (0.575 mole) of styrene were likewise fed over 8 hours. After the feeding, stirring was conducted at the same temperature for additional 2 hours, followed by the addition of water. The mixture so obtained was neutralized with an aqueous solution of sodium hydroxide, and 1,2-dichloroethane was distilled off. The aqueous solution was added dropwise over 3 hours into 217.4 g of a 12.6 wt. % aqueous solution of zinc sulfate heptahydrate, the latter aqueous solution having been maintained at 20° C. or lower, and the resulting mixture was stirred for 2 hours. Thereafter, the reaction product was caused to coagulate at 30° C., collected by filtration, washed with water and then dried, whereby 95.2 g of a color-developing agent were obtained as white crystals.

COMPARATIVE EXAMPLE 2

This comparative example was conducted following the process disclosed in Japanese Patent Laid-Open No. 286304/1994 referred to above.

A glass-made reaction vessel was charged with 1.9 g (0.02 mole) of phenol and 0.2 g of methanesulfonic acid. While maintaining the resultant solution at 120° C. under stirring, 4.2 g (0.04 mole) of styrene were fed over 2 hours through a dropping funnel, whereby a pale-yellow, transparent reaction product composed of 1 mole of phenol and 2 moles of styrene was obtained. Another reaction vessel was charged with 27.6 g (0.20 mole) of salicylic acid, 12.1 g (43 wt. % based on the salicylic acid, calculated as 100% sulfuric acid) of 98% sulfuric acid and 50 g of 1,2-dichloroethane. While maintaining the resultant solution at 45° C. under stirring, 62.5 g (0.6 mole) of styrene were fed over 8 hours through the dropping funnel. Stirring was conducted at the same temperature for additional 2 hours, followed by the addition of water. After the mixture so obtained was neutralized with an aqueous solution of sodium hydroxide, the reaction product synthesized before and composed of 1 mole of phenol and 2 moles of styrene was added, followed by stirring. 1,2-Dichloroethane was distilled off. The resultant aqueous solution was added dropwise over 3 hours into 217.4 g of a 12.6 wt. % aqueous solution of zinc sulfate heptahydrate, the latter aqueous solution having been maintained at 20° C. or lower, and the resulting mixture was stirred for 2 hours. Thereafter, the reaction product was caused to coagulate at 30° C., collected by filtration, washed with water and then dried, whereby 100.1 g of a color-developing agent were obtained as white crystals.

TABLE 9

| Example or Comparative Example | Produced color density 10 seconds later | Produced color density 24 hours later | Color density after waterproofness test |
|---|---|---|---|
| 1 | 43.2 | 34.1 | 36.2 |
| 2 | 42.8 | 33.7 | 35.8 |
| 3 | 43.4 | 33.9 | 36.0 |
| 4 | 43.0 | 33.8 | 35.5 |
| 5 | 42.0 | 33.6 | 35.6 |
| 6 | 43.6 | 34.0 | 36.6 |
| 7 | 43.8 | 34.3 | 36.7 |
| 8 | 43.0 | 34.0 | 36.7 |
| 9 | 42.4 | 33.8 | 36.6 |
| 10 | 42.8 | 33.8 | 35.5 |
| 11 | 41.5 | 33.7 | 35.9 |
| 12 | 43.2 | 34.1 | 36.4 |
| 13 | 43.5 | 34.5 | 36.7 |
| 14 | 42.3 | 33.5 | 36.3 |
| 15 | 42.0 | 33.7 | 35.0 |
| 16 | 41.7 | 33.7 | 35.7 |
| 17 | 41.0 | 33.6 | 35.1 |
| 18 | 42.5 | 34.0 | 36.1 |
| 19 | 43.2 | 34.1 | 36.8 |
| 20 | 41.2 | 33.5 | 35.3 |
| 21 | 43.6 | 33.7 | 36.1 |
| 22 | 43.1 | 33.9 | 35.8 |
| 23 | 43.0 | 33.1 | 35.9 |
| 24 | 42.5 | 33.0 | 35.0 |
| 25 | 43.5 | 34.1 | 36.2 |
| 26 | 43.7 | 34.4 | 36.8 |
| 27 | 43.1 | 34.2 | 35.9 |
| 28 | 42.7 | 34.1 | 35.4 |
| 29 | 42.5 | 34.0 | 35.7 |
| 30 | 41.6 | 33.9 | 35.6 |
| 31 | 43.3 | 34.3 | 36.5 |
| 32 | 43.5 | 34.6 | 36.6 |
| 33 | 43.7 | 34.8 | 36.7 |
| 34 | 43.5 | 34.7 | 36.6 |
| 35 | 43.1 | 34.7 | 36.8 |
| 36 | 42.0 | 34.6 | 36.4 |
| 37 | 43.9 | 34.9 | 36.9 |
| 38 | 44.2 | 35.1 | 37.1 |
| 39 | 42.9 | 34.0 | 36.1 |
| 40 | 42.2 | 33.7 | 35.5 |

TABLE 9-continued

| Example or Comparative Example | Produced color density 10 seconds later | Produced color density 24 hours later | Color density after waterproofness test |
|---|---|---|---|
| 41 | 41.8 | 33.5 | 35.9 |
| 42 | 41.2 | 33.3 | 35.8 |
| 43 | 42.7 | 34.1 | 36.2 |
| 44 | 43.5 | 34.4 | 36.6 |
| 45 | 43.8 | 33.3 | 35.6 |
| 46 | 43.2 | 33.4 | 35.6 |
| 47 | 42.9 | 33.7 | 35.7 |
| 48 | 42.2 | 33.5 | 35.5 |
| 49 | 43.7 | 34.0 | 35.9 |
| 50 | 44.1 | 34.6 | 36.6 |
| 1 | 48.5 | 36.9 | 39.3 |
| 2 | 49.0 | 37.6 | 41.1 |

From the results of Table 9, it is evident that a color-developing sheet available from the use of a color-developing agent obtained in accordance with this invention is excellent in the storage stability (waterproofness) of produced color marks and is also excellent in both initial and ultimate color-developing capacities.

The present invention has made it possible to industrially obtain a color-developing agent, which is excellent in both initial and ultimate color-developing capacities, with ease under extremely mild reaction conditions.

What is claimed is:

1. A color-developing agent comprising a multivalent metal salt of a salicylic acid derivative and a sulfonated phenol and/or a metal salt thereof.

2. A color-developing agent according to claim 1, wherein the content of the sulfonated phenol and/or the metal salt thereof is 0.5 to 40 mole % based on the multivalent metal salt of the salicylic acid derivative.

3. A color-developing agent according to claim 1, wherein the salicylic acid derivative is a styrene-substituted salicylic acid or a derivative thereof.

4. A color-developing agent according to claim 1, wherein the sulfonated phenol is a styrene-substituted sulfonated phenol.

5. A color-developing agent comprising a multivalent metal salt of a styrene-substituted salicylic acid derivative and a styrene-substituted sulfonated phenol and/or a metal salt thereof, said multivalent metal salt having been obtained by reacting a styrene with a salicylic acid and a phenol in the presence of sulfuric acid as a catalyst and sulfonating agent to obtain a resin and then reacting a multivalent metal compound with the resin.

6. A process for the production of a color-developing agent comprising a multivalent metal salt of a styrene-substituted salicylic acid derivative and a styrene-substituted sulfonated phenol and/or a metal salt thereof, which comprises reacting a styrene with a salicylic acid and a phenol in the presence of sulfuric acid as a catalyst and sulfonating agent to obtain a resin and then reacting a multivalent metal compound with the resin.

7. A process according to claim 6, wherein the phenol is used in an amount of 0.5 to 40 mole % based on the salicylic acid.

8. A process according to claim 6,.wherein the styrene is used in an amount 1 to 10 molar times as much as the phenol and salicylic acid.

9. A color-developing agent comprising a multivalent metal salt of a styrene-substituted salicylic acid derivative and a styrene-substituted sulfonated phenol and/or a metal salt thereof, said multivalent metal salt having been obtained by conducting a first-stage reaction of reacting a phenol and a styrene in the presence of sulfuric acid as a catalyst and sulfonating agent and then a second-stage reaction of adding, to the resulting reaction mixture, a salicylic acid and then the styrene to obtain a resin, followed by the reaction of the resin with a multivalent metal salt.

10. A process for the production of a color-developing agent comprising a multivalent metal salt of a styrene-substituted salicylic acid derivative and a styrene-substituted sulfonated phenol and/or a metal salt thereof, which comprises conducting a first-stage reaction of reacting a phenol and a styrene in the presence of sulfuric acid as a catalyst and sulfonating agent and then a second-stage reaction of adding, to the resulting reaction mixture, a salicylic acid and then the styrene to obtain a resin, followed by the reaction of the resin with a multivalent metal salt.

11. A process according to claim 10, wherein the phenol is used in an amount of 0.5 to 40 mole % based on the salicylic acid.

12. A process according to claim 10, wherein the styrene used in the first-stage reaction is in an amount 1 to 10 molar times as much as the phenol.

13. A process according to claim 10, wherein the total amount of the styrene used in the first-stage and second-stage reactions is 1 to 15 times as much as that of the phenol and salicylic acid.

14. A color-developing sheet with a layer formed thereon and comprising a color-developing agent according to claim 1.

15. A color-developing sheet with a layer formed thereon and comprising a color-developing agent according to claim 2.

16. A color-developing sheet with a layer formed thereon and comprising a color-developing agent according to claim 3.

17. A color-developing sheet with a layer formed thereon and comprising a color-developing agent according to claim 4.

18. A color-developing sheet with a layer formed thereon and comprising a color-developing agent according to claim 5.

19. A color-developing sheet with a layer formed thereon and comprising a color-developing agent according to claim 9.

* * * * *